United States Patent

Sakamoto

(10) Patent No.: US 9,739,988 B2
(45) Date of Patent: Aug. 22, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Masaru Sakamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 14/836,389

(22) Filed: Aug. 26, 2015

(65) Prior Publication Data

US 2016/0062092 A1   Mar. 3, 2016

(30) Foreign Application Priority Data

Aug. 28, 2014   (JP) ................. 2014-173916

(51) Int. Cl.
| | | |
|---|---|---|
| *G02B 15/17* | (2006.01) | |
| *G02B 15/24* | (2006.01) | |
| *G02B 27/00* | (2006.01) | |
| *H04N 5/225* | (2006.01) | |
| *H04N 5/232* | (2006.01) | |

(52) U.S. Cl.
CPC .............. *G02B 15/17* (2013.01); *G02B 15/24* (2013.01); *G02B 27/0025* (2013.01); *H04N 5/2254* (2013.01); *H04N 5/23296* (2013.01)

(58) Field of Classification Search
CPC .... G02B 15/17; G02B 15/173; G02B 15/163; G02B 15/167; G02B 15/24; G02B 15/26
USPC .................................. 359/683–685
See application file for complete search history.

(56) References Cited

U.S. PATENT DOCUMENTS

| | | | | |
|---|---|---|---|---|
| 6,646,804 B2 * | 11/2003 | Harada | ................. | G02B 15/173 359/554 |
| 7,289,274 B1 * | 10/2007 | Saori | .................... | G02B 15/173 359/684 |
| 8,456,747 B2 * | 6/2013 | Sakamoto | ............ | G02B 15/173 359/676 |

(Continued)

FOREIGN PATENT DOCUMENTS

| | | |
|---|---|---|
| JP | H11-38321 A | 2/1999 |
| JP | 2003-262793 A | 9/2003 |
| JP | 2011-107693 A | 6/2011 |

OTHER PUBLICATIONS

European Search Report issued in corresponding application No. EP 15002476.8 on Dec. 21, 2015.

*Primary Examiner* — Zachary Wilkes
(74) *Attorney, Agent, or Firm* — Carter, DeLuca, Farrell & Schmidt, LLP

(57) ABSTRACT

A zoom lens including, in order from an object side: a positive first lens unit that does not move for zooming; a negative second lens unit that moves during the zooming; a negative third lens unit that moves along a locus convex to the object side during the zooming; an aperture stop; and a positive fourth lens unit that does not move for the zooming. The third lens unit includes a cemented lens formed by cementing a single negative lens and a single positive lens and a single negative lens. A focal length (fn1) of the single negative lens included in the cemented lens, a focal length (fp) of the single positive lens included in the cemented lens, and a lateral magnification ($\beta 3w$) of the third lens unit at a wide angle end are each appropriately set.

8 Claims, 18 Drawing Sheets

(56) References Cited

U.S. PATENT DOCUMENTS

| | | | | |
|---|---|---|---|---|
| 8,736,969 B2* | 5/2014 | Sakamoto | ............. | G02B 15/14 359/676 |
| 9,494,776 B2* | 11/2016 | Nagatoshi | ............. | G02B 15/14 |
| 2013/0201565 A1 | 8/2013 | Yamanaka | | |
| 2015/0362711 A1* | 12/2015 | Wakazono | ............. | G02B 15/16 359/684 |

* cited by examiner

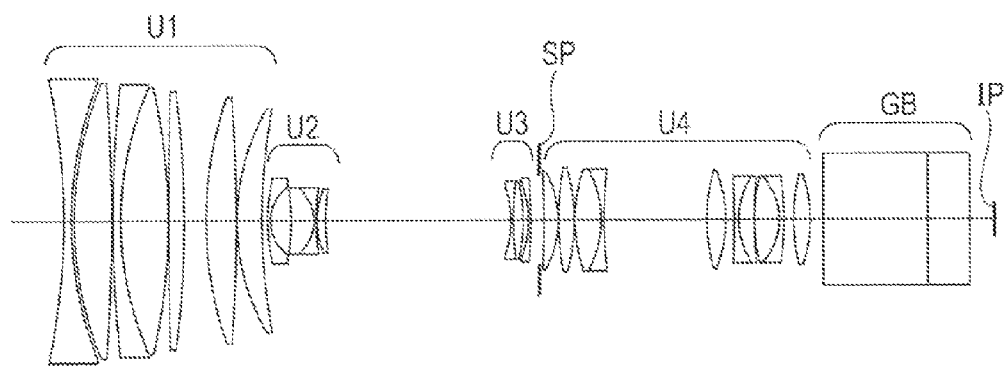
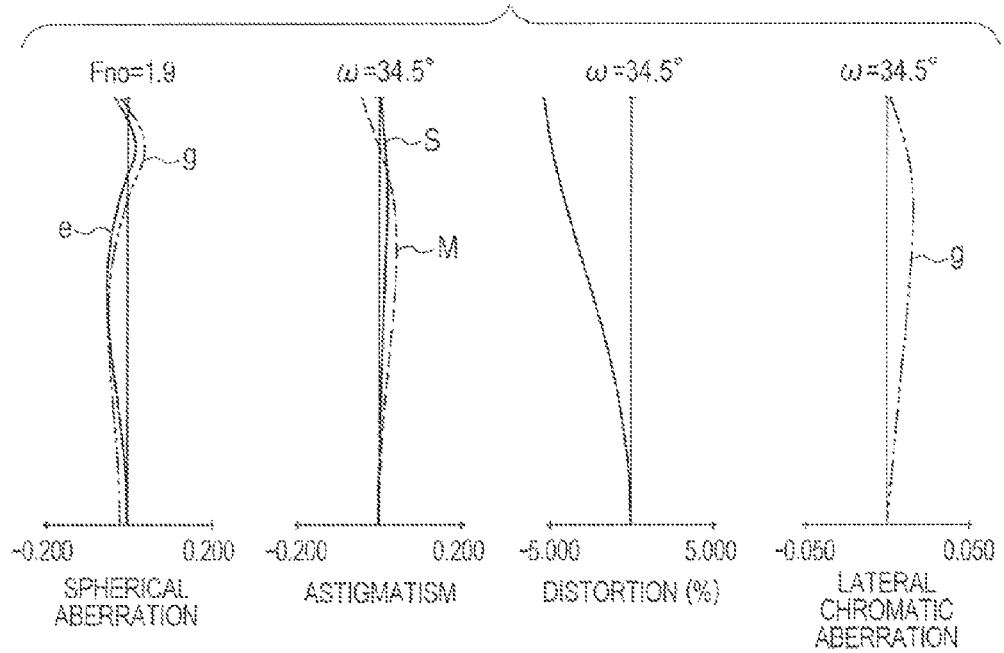

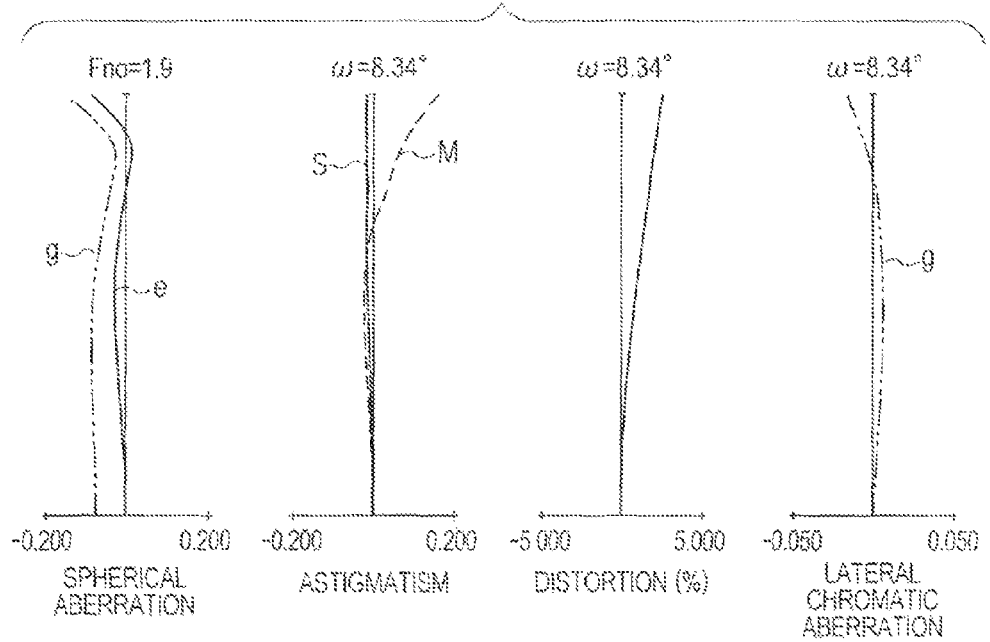
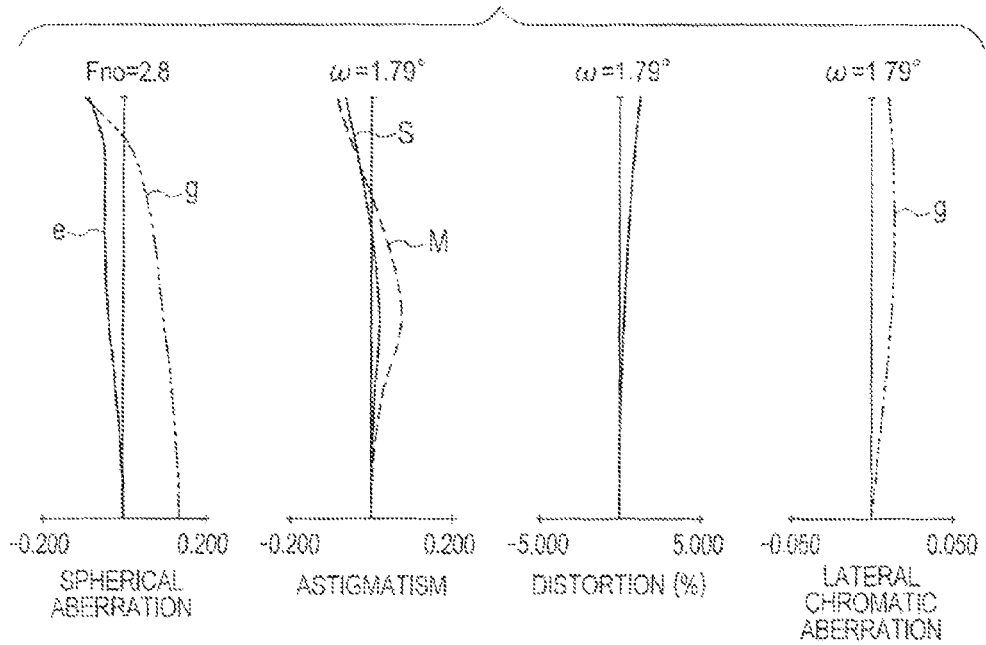

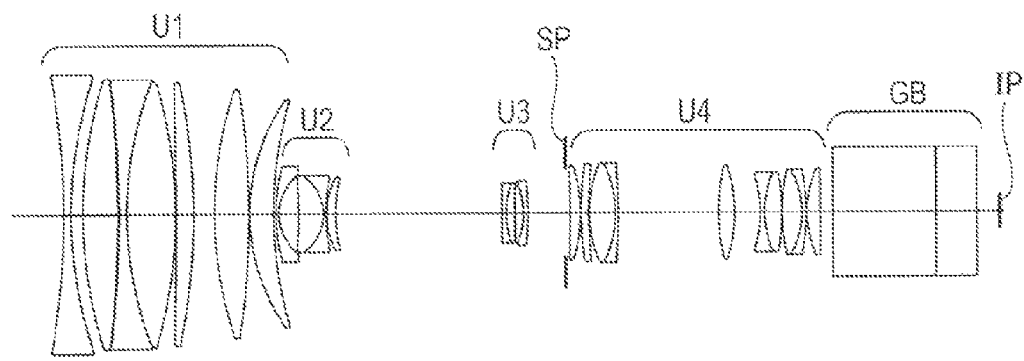
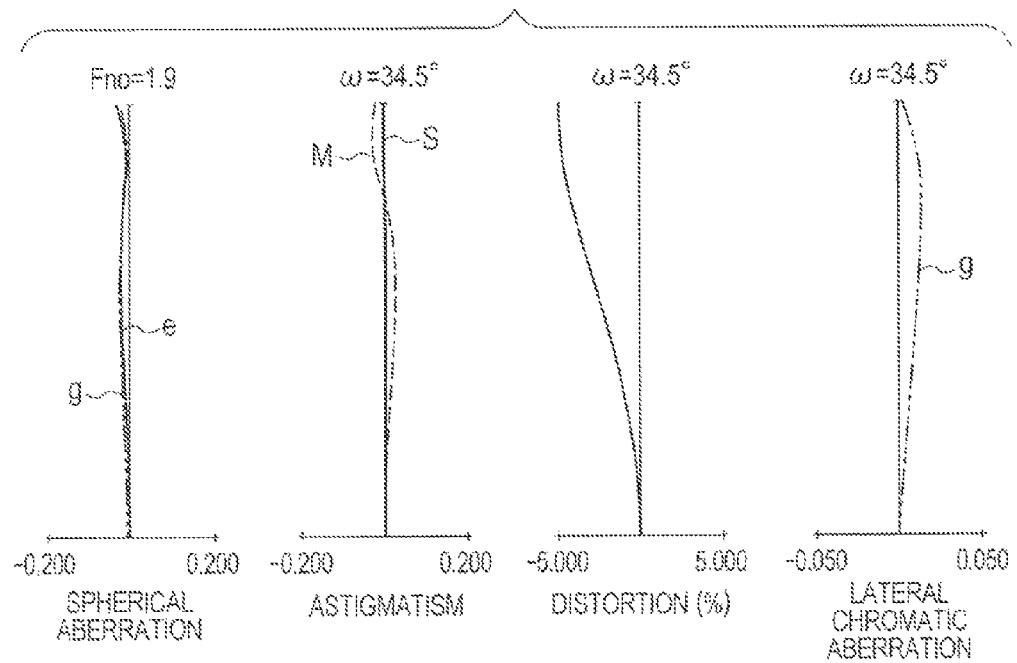

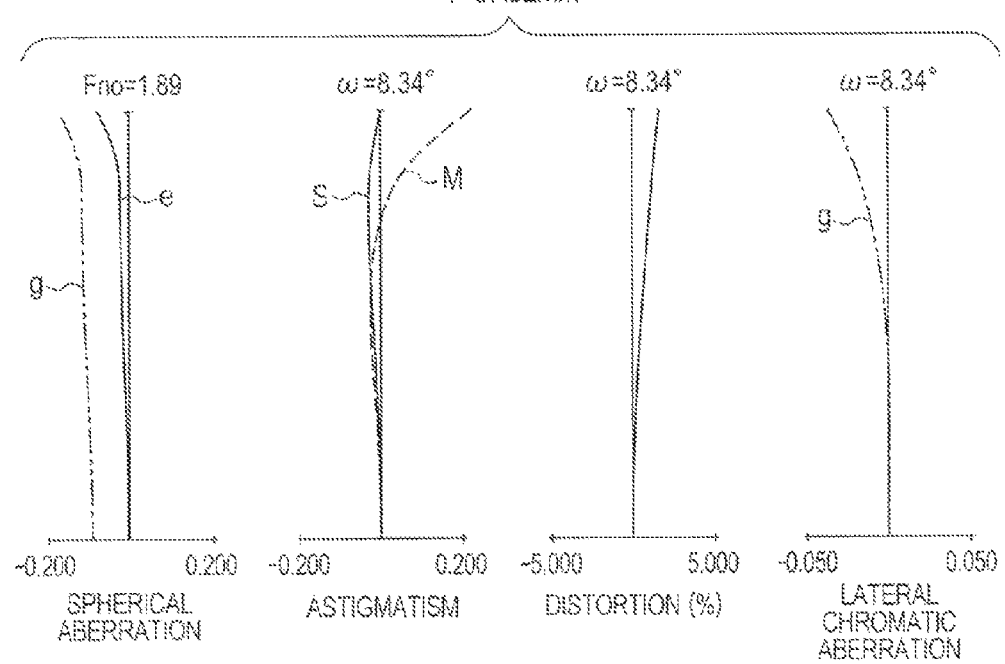
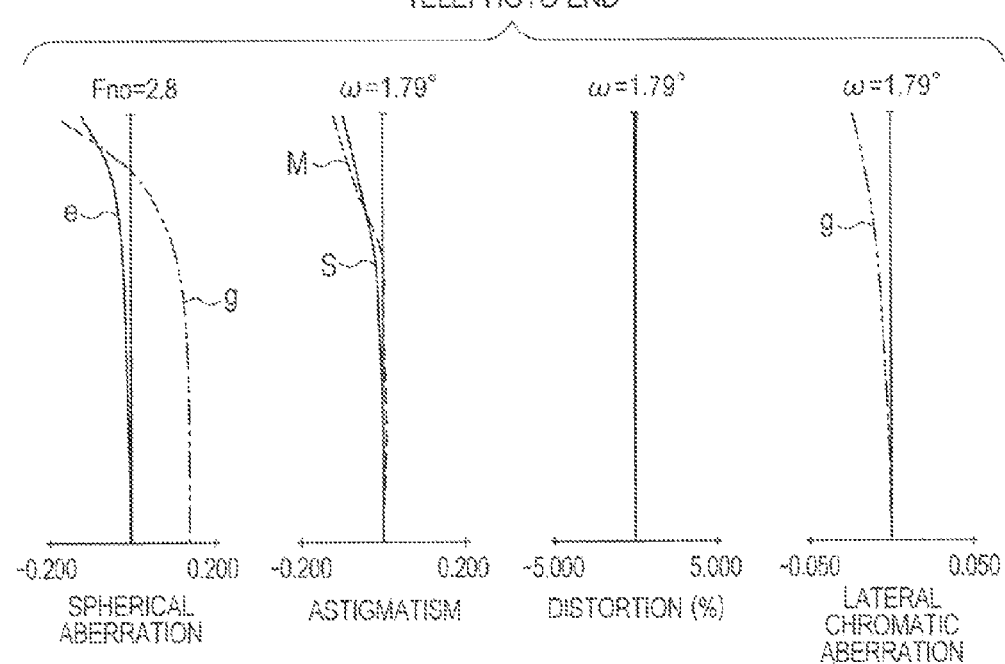

WIDE ANGLE END

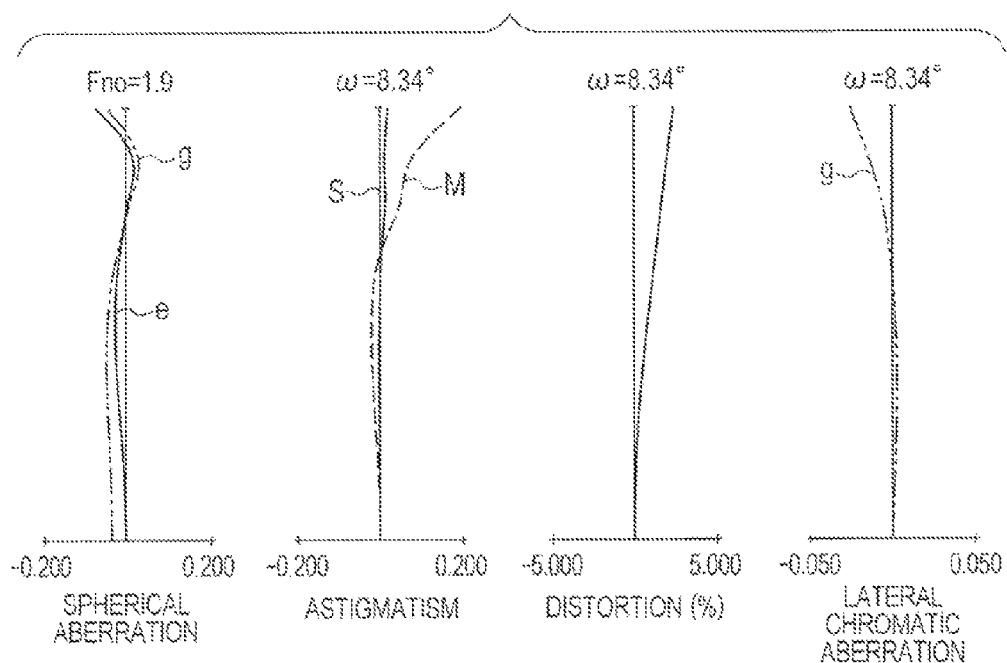
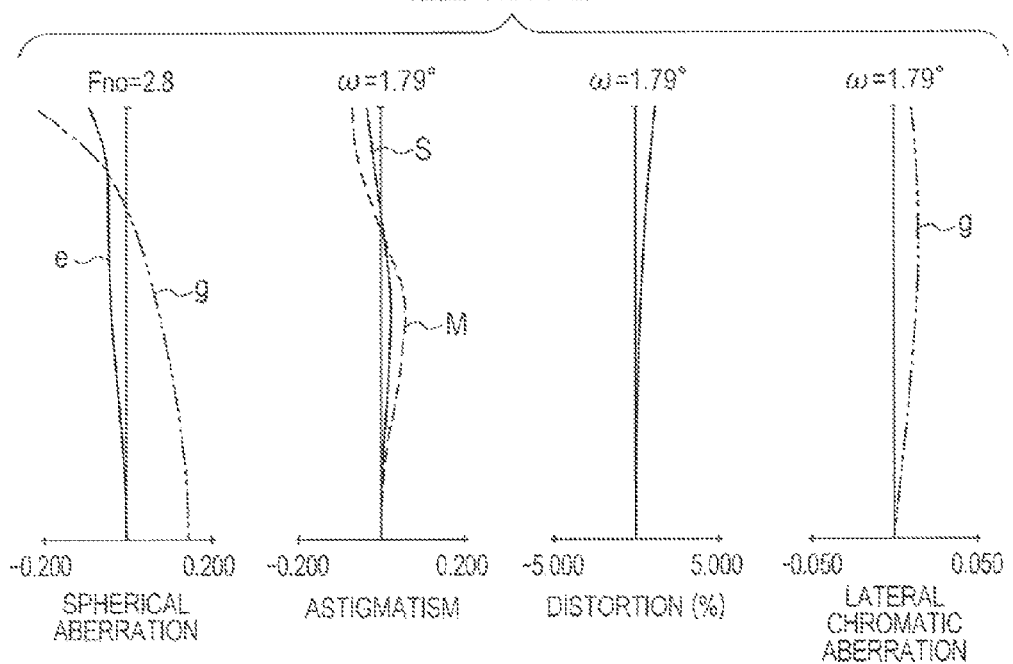

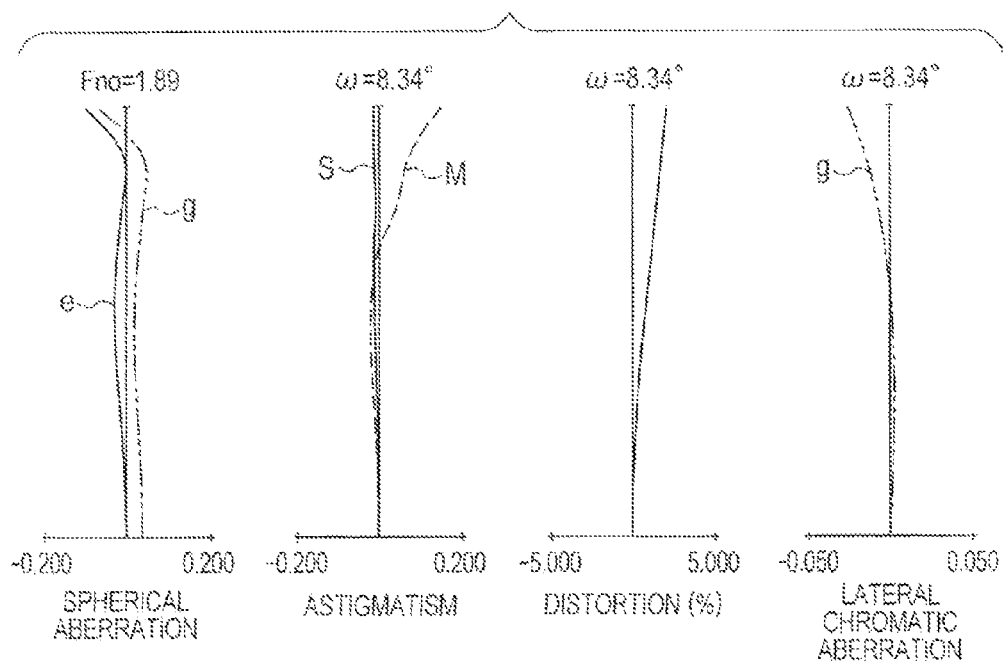
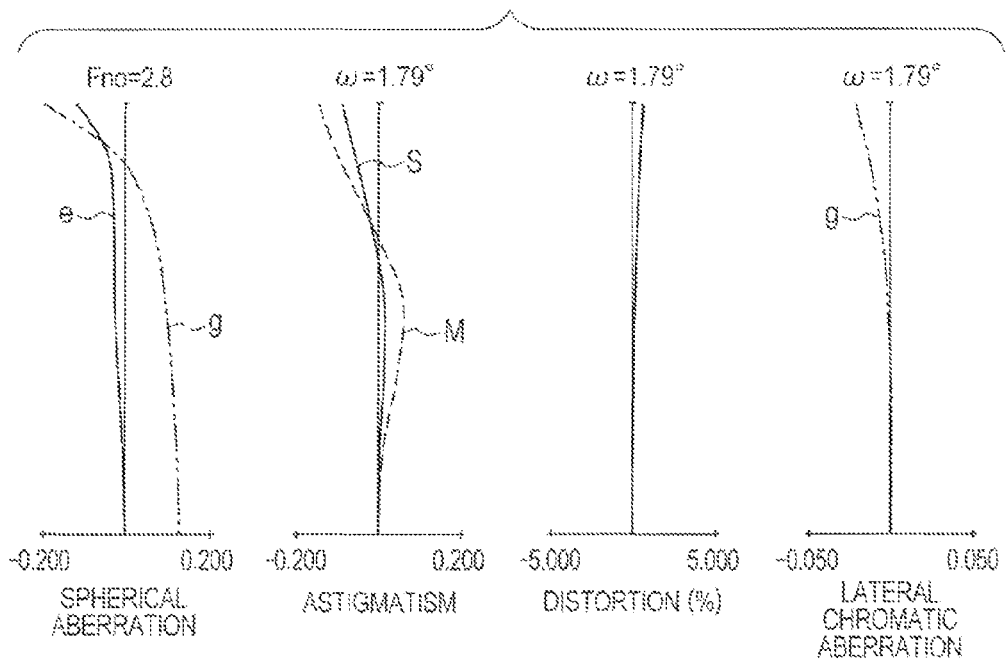

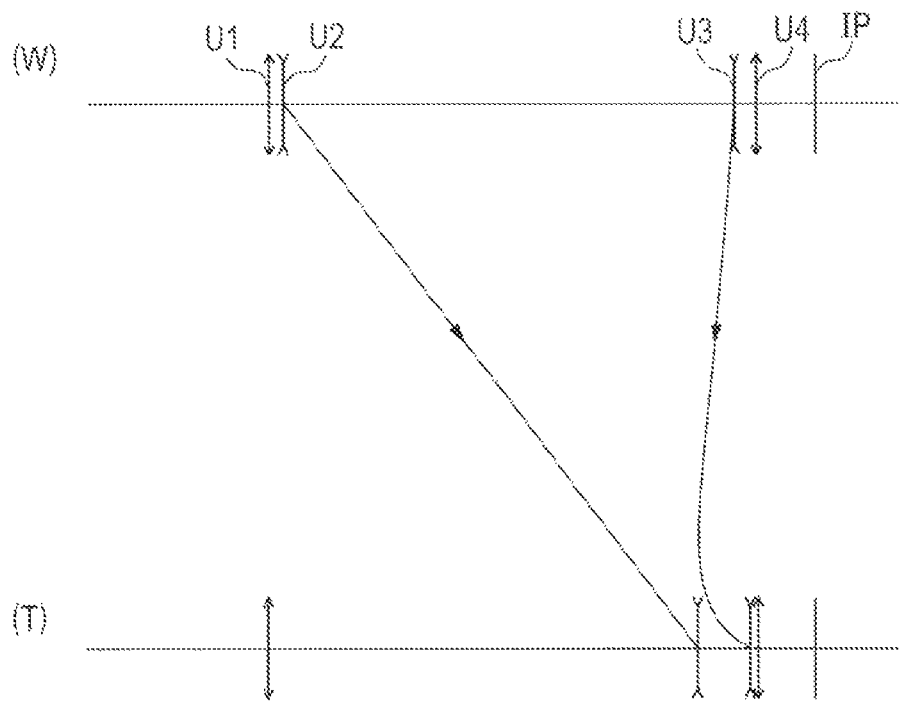
FIG. 17  LOCI OF LENS MOVEMENT IN FOUR-UNIT CONFIGURATION
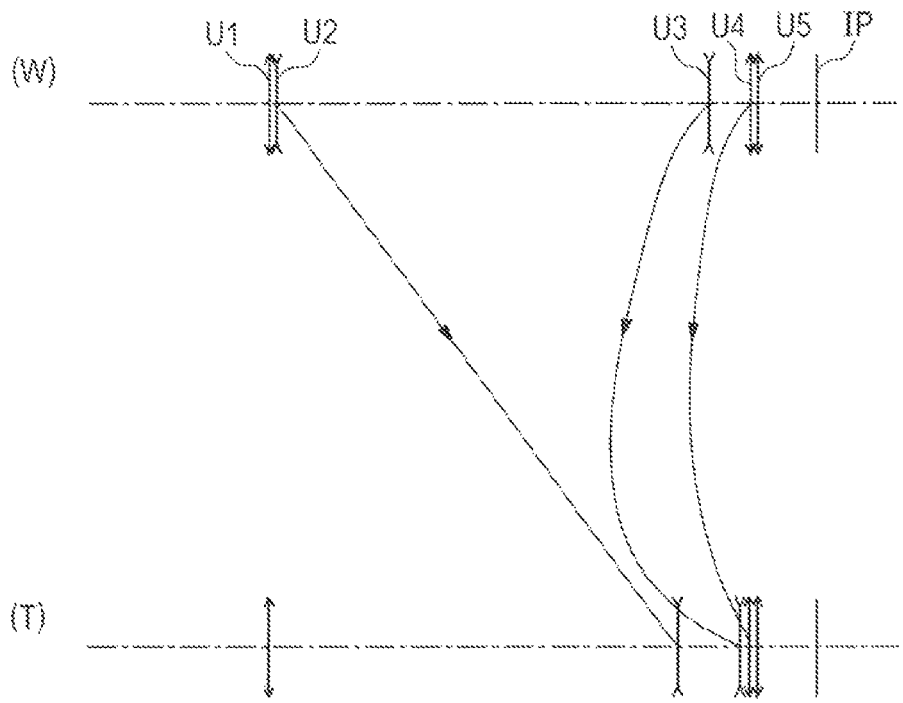
FIG. 18  LOCI OF LENS MOVEMENT IN FIVE-UNIT CONFIGURATION

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are particularly suitable for an image pickup apparatus, such as a broadcasting television camera, a video camera, a digital still camera, and a silver-halide film camera.

Description of the Related Art

In recent years, a zoom lens having a large aperture ratio, a high zoom ratio, and high optical performance has been demanded for an image pickup apparatus. As the zoom lens having the large aperture ratio and the high zoom ratio, there has been known a positive-lead type zoom lens, in which a lens unit having a positive refractive power is arranged closest to an object side (Japanese Patent Application Laid-Open No. H11-38321 and Japanese Patent Application Laid-Open No. 2011-107693).

In Japanese Patent Application Laid-Open No. H11-38321, there is disclosed a four-unit zoom lens including, in order from an object side to an image side, a first lens unit having a positive refractive power, a second lens unit for zooming, which has a negative refractive power, a third lens unit having a negative refractive power, which is configured to correct image plane variation accompanying zooming, and a fourth lens unit for imaging, which has a positive refractive power. In the zoom lens disclosed in Japanese Patent Application Laid-Open No. H11-38321, during zooming from a wide angle end to a telephoto end, the second lens unit moves to the image side, and the third lens unit moves along a locus convex to the object side. Through appropriate settings of the lens configurations of the respective lens units, the disclosed zoom lens has a wide angle of field, a high zoom ratio, and high optical performance over the entire zoom range, and is thus suitable for a television camera.

In Japanese Patent Application Laid-Open No. 2011-107693, there is disclosed a five-unit zoom lens including a first lens unit having a positive refractive power, a second lens unit having a negative refractive power, a third lens unit having a negative refractive power, a fourth lens unit having a positive refractive power, and a fifth lens unit having a positive refractive power, which is configured not to move for zooming. In this five-unit zoom lens, a zooming portion constructed by three movable lens units, namely, the second lens unit having the negative refractive power, the third lens unit having the negative refractive power, and the fourth lens unit having the positive refractive power, performs zooming and corrects image plane variation accompanying the zooming.

It is relatively easy for the above-mentioned four-unit and five-unit zoom lenses of positive lead type to achieve a high zoom ratio. As the zoom ratio becomes higher, however, a larger variation in various aberrations occurs during zooming, and it becomes more difficult to obtain high optical performance over the entire zoom range. In particular, the variation in various aberrations accompanying zooming is increased due to the third lens unit having the negative refractive power. For example, in a range from the wide angle end to an intermediate zoom position, a variation in spherical aberration is increased, and further, a variation in spherochromatic aberration caused by a wavelength difference is increased.

Thus, in the above-mentioned four-unit and five-unit zoom lenses, in order to obtain high optical performance while achieving a wide angle of field and a high zoom ratio, it is important to appropriately set the lens configuration of the third lens unit. When the lens configuration of the third lens unit is inappropriate, variations in spherical aberration and curvature of field are increased in the zoom range from the wide angle end to the intermediate zoom position, and it is difficult to obtain high optical performance in the entire zoom range with a high zoom ratio.

SUMMARY OF THE INVENTION

The present invention has an object of providing a zoom lens that has a wide angle of field and a high zoom ratio, is capable of satisfactorily correcting various aberrations over an entire zoom range from a wide angle end to a telephoto end, and has high optical performance in the entire zoom range, and providing an image pickup apparatus including the zoom lens.

A zoom lens according to one embodiment of the present invention includes, in order from an object side to an image side: a first lens unit having a positive refractive power that does not move for zooming; a second lens unit having a negative refractive power that moves during the zooming; a third lens unit having a negative refractive power that moves along a locus convex to the object side during the zooming; an aperture stop; and a fourth lens unit having a positive refractive power that does not move for the zooming, the third lens unit including: a cemented lens formed by cementing a single negative lens and a single positive lens; and a single negative lens, in which the following conditional expressions are satisfied:

$$0.60 < |fn1/fp51| < 0.97; \text{ and}$$

$$0.24 < \beta 3w < 0.53,$$

where fn1 represents a focal length of the single negative lens included in the cemented lens, fp represents a focal length of the single positive lens included in the cemented lens, and β3w represents a lateral magnification of the third lens unit at a wide angle end.

In addition, a zoom lens according to one embodiment of the present invention includes, in order from an object side to an image side: a first lens unit having a positive refractive power, which moves for zooming; a second lens unit having a negative refractive power, which moves during the zooming; a third lens unit having a negative refractive power, which moves during the zooming; a fourth lens unit having a positive refractive power, which moves during the zooming; an aperture stop; and a fifth lens unit having a positive refractive power, which does not move for zooming, the third lens unit including: a cemented lens formed by cementing a single negative lens and a single positive lens; and a single negative lens, in which the following conditional expressions are satisfied:

$$0.60 < |fn1x/fpx| < 3.5; \text{ and}$$

$$0.24 < \beta 3wx < 0.53,$$

where fn1x represents a focal length of the single negative lens included in the cemented lens, fpx represents a focal length of the single positive lens included in the cemented lens, and β3wx represents a lateral magnification of the third lens unit at a wide angle end.

According to the one embodiment of the present invention, there are provided the zoom lens that has the wide angle of field and the high zoom ratio, is capable of satisfactorily correcting the various aberrations over the entire zoom range from the wide angle end to the telephoto end, and has high optical performance in the entire zoom range, and the image pickup apparatus including the zoom lens.

Further features of the present invention will become apparent from the following description of exemplary embodiments with reference to the attached drawings.

BRIEF DESCRIPTION OF THE DRAWINGS

FIG. 1 is a lens cross-sectional view at a wide angle end according to Embodiment 1 (Numerical Embodiment 1) of the present invention.

FIG. 2A is an aberration diagram at the wide angle end according to Embodiment 1 (Numerical Embodiment 1) (at an object distance of 2.5 m).

FIG. 2B is an aberration diagram at f=37.52 mm according to Embodiment 1 (Numerical Embodiment 1) (at an object distance of 2.5 m).

FIG. 2C is an aberration diagram at a telephoto end according to Embodiment 1 (Numerical Embodiment 1) (at an object distance of 2.5 m).

FIG. 3 is a lens cross-sectional view at a wide angle end according to Embodiment 2 (Numerical Embodiment 2) of the present invention.

FIG. 4A is an aberration diagram at the wide angle end according to Embodiment 2 (Numerical Embodiment 2) (at an object distance of 2.5 m).

FIG. 4B is an aberration diagram at f=37.52 mm according to Embodiment 2 (Numerical Embodiment 2) (at an object distance of 2.5 m).

FIG. 4C is an aberration diagram at a telephoto end according to Embodiment 2 (Numerical Embodiment 2) (at an object distance of 2.5 m).

FIG. 6B is an aberration diagram at f=37.52 mm according to Embodiment 3 (Numerical Embodiment 3) (at an object distance of 2.5 m).

FIG. 6C is an aberration diagram at a telephoto end according to Embodiment 3 (Numerical Embodiment 3) (at an object distance of 2.5 m).

FIG. 8B is an aberration diagram at f=37.52 mm according to Embodiment 4 (Numerical Embodiment 4) (at an object distance of 2.5 m).

FIG. 8C is an aberration diagram at a telephoto end according to Embodiment 4 (Numerical Embodiment 4) (at an object distance of 2.5 m).

FIG. 17 is an explanatory diagram of zooming loci of a zoom lens according to the present invention.

FIG. 18 is an explanatory diagram of zooming loci of the zoom lens according to the present invention.

DESCRIPTION OF THE EMBODIMENTS

Figure 5:
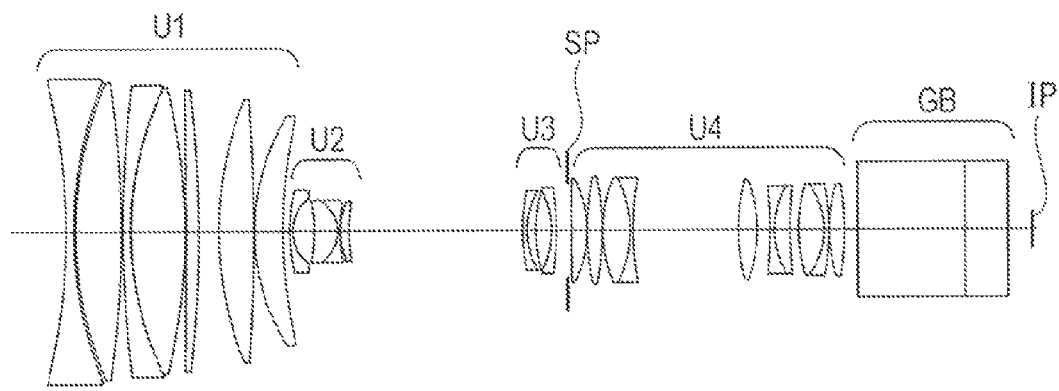
FIG. 5 is a lens cross-sectional view at a wide angle end according to Embodiment 3 (Numerical Embodiment 3) of the present invention.

Preferred embodiments of the present invention will now be described in detail in accordance with the accompanying drawings.

In the following, embodiments of the present invention are described in detail with reference to the attached drawings. A zoom lens of the present invention includes the following in order from an object side to an image side. The zoom lens includes a first lens unit having a positive refractive power, which is configured not to move for zooming, and a second lens unit having a negative refractive power, which is configured to move during the zooming. The zoom lens further includes a third lens unit having a negative refractive power, which is configured to move along a locus convex to the object side during the zooming. The zoom lens further includes an aperture stop, and a fourth lens unit having a positive refractive power, which is configured not to move for the zooming.

In addition, the zoom lens of the present invention includes, in order from the object side to the image side, a first lens unit having a positive refractive power, which is configured not to move for zooming, a second lens unit having a negative refractive power, which is configured to move during the zooming, and a third lens unit having a negative refractive power, which is configured to move during the zooming. The zoom lens further includes a fourth lens unit having a positive refractive power, which is configured to move during the zooming, an aperture stop, and a fifth lens unit having a positive refractive power, which is configured not to move for the zooming.

FIG. 1 is a lens cross-sectional view at a wide angle end (short-focal-length end) according to Embodiment 1 of the present invention (at an object distance of infinity). FIGS. 2A, 2B, and 2C are aberration diagrams at the wide angle end, at a focal length f of an entire system of the zoom lens of 37.52 min, and at a telephoto end (long-focal-length end), respectively, according to Embodiment 1 (at an object distance of 2.5 m). The zoom lens according to Embodiment 1 has a zoom ratio of 22.00, an F-number of from 1.90 to 2.80, and an angle of view in image taking of from 69.02 to 3.580. Note that, the focal length of the entire system of the zoom lens and the object distance are values when each value of Numerical Embodiments to be described later is expressed in units of mm. The object distance is a distance from the first lens surface. The same shall apply hereinafter.

FIG. 3 is a lens cross-sectional view at a wide angle end according to Embodiment 2 of the present invention (at an object distance of infinity). FIGS. 4A, 4B, and 4C are aberration diagrams at the wide angle end, at a focal length f of an entire system of the zoom lens of 37.52 mm, and at a telephoto end, respectively, according to Embodiment 2 (at an object distance of 2.5 m). The zoom lens according to Embodiment 2 has a zoom ratio of 22.00, an F-number of from 1.90 to 2.80, and an angle of view in image taking of from 69.02° to 3.58°.

Figure 6A:
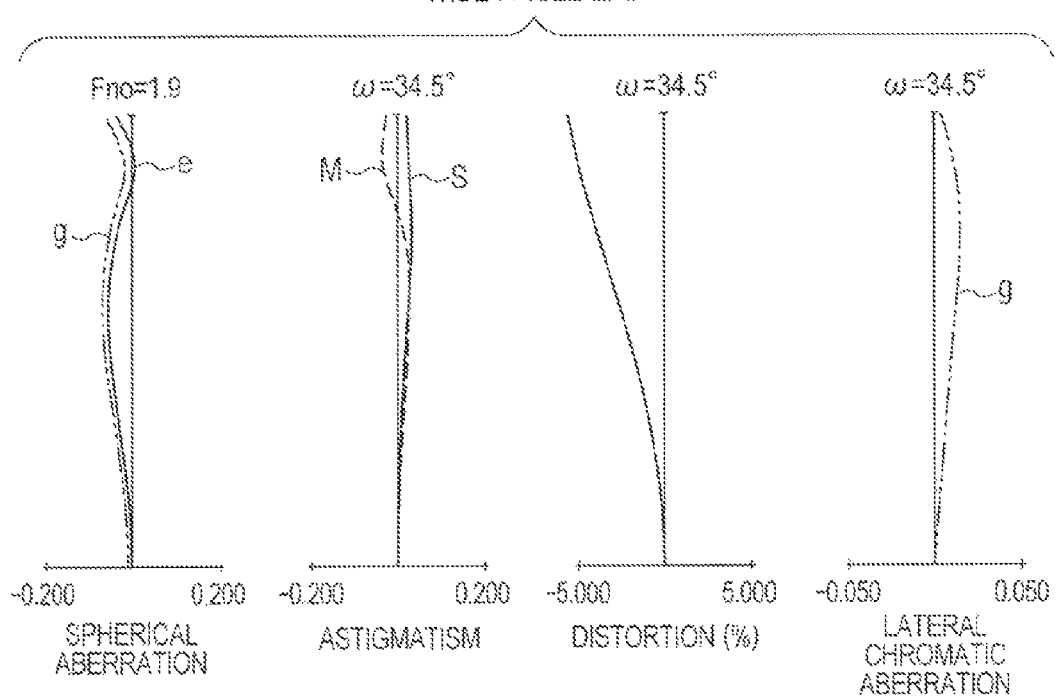
FIG. 6A is an aberration diagram at the wide angle end according to Embodiment 3 (Numerical Embodiment 3) (at an object distance of 2.5 m).

FIG. 5 is a lens cross-sectional view at a wide angle end according to Embodiment 3 of the present invention (at an object distance of infinity). FIGS. 6A, 6B, and 6C are aberration diagrams at the wide angle end, at a focal length f of an entire system of the zoom lens of 37.52 mm, and at a telephoto end, respectively, according to Embodiment 3 (at an object distance of 2.5 m). The zoom lens according to Embodiment 3 has a zoom ratio of 22.00, an F-number of from 1.90 to 2.78, and an angle of view in image taking of from 69.02° to 3.58°.

Figure 7:
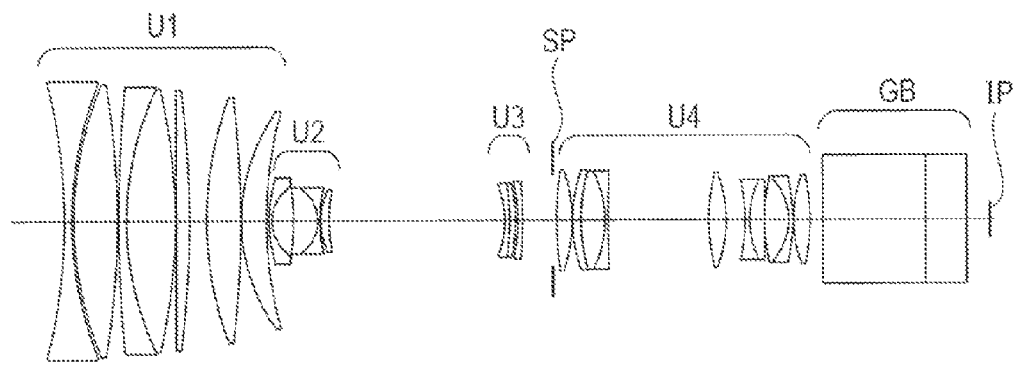
FIG. 7 is a lens cross-sectional view at a wide angle end according to Embodiment 4 (Numerical Embodiment 4) of the present invention.
Figure 8A:
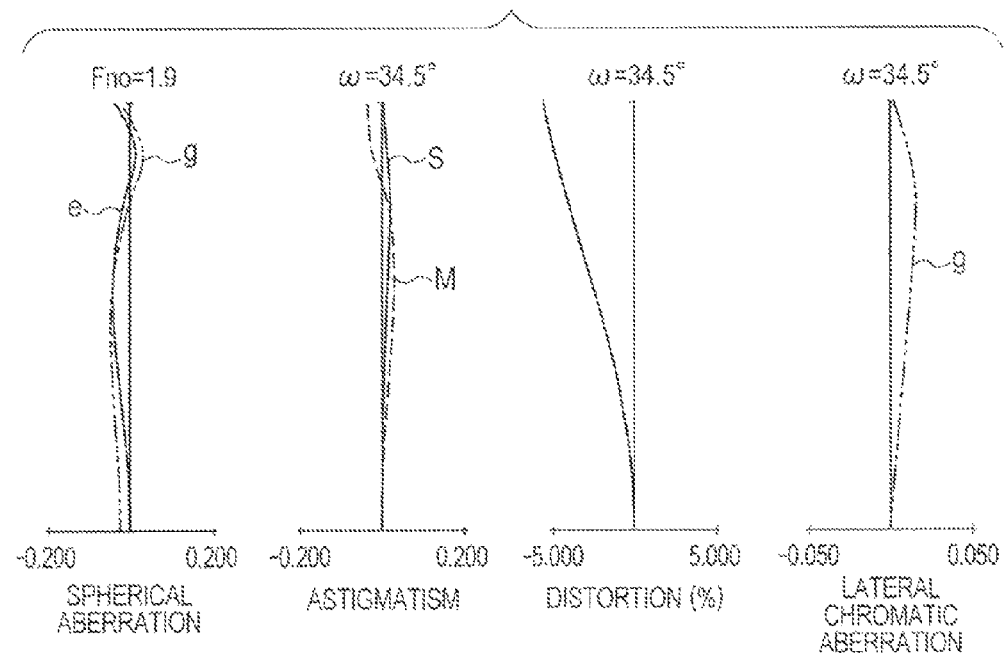
FIG. 8A is an aberration diagram at the wide angle end according to Embodiment 4 (Numerical Embodiment 4) (at an object distance of 2.5 m).

FIG. 7 is a lens cross-sectional view at a wide angle end according to Embodiment 4 of the present invention (at an object distance of infinity). FIGS. 8A, 8B, and 8C are aberration diagrams at the wide angle end, at a focal length f of an entire system of the zoom lens of 37.52 mm, and at a telephoto end, respectively, according to Embodiment 4 (at an object distance of 2.5 m). The zoom lens according to Embodiment 4 has a zoom ratio of 22.00, an F-number of from 1.90 to 2.80, and an angle of view of image taking of from 69.02° to 3.58°.

Figure 9:
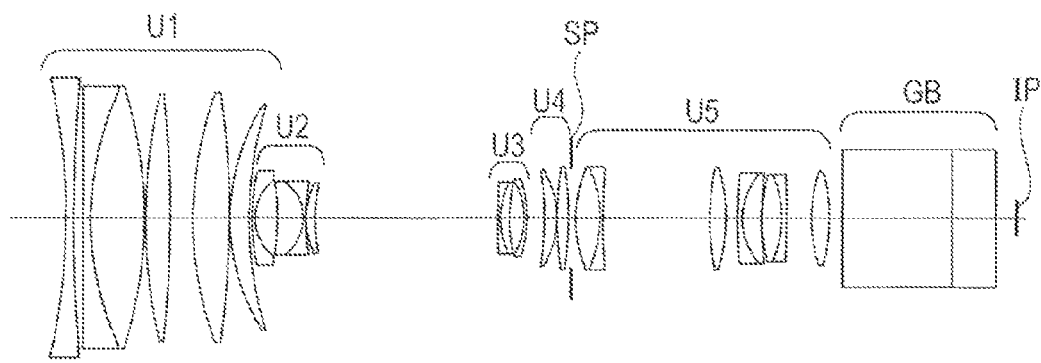
FIG. 9 is a lens cross-sectional view at a wide angle end according to Embodiment 5 (Numerical Embodiment 5) of the present invention.
Figure 10A:
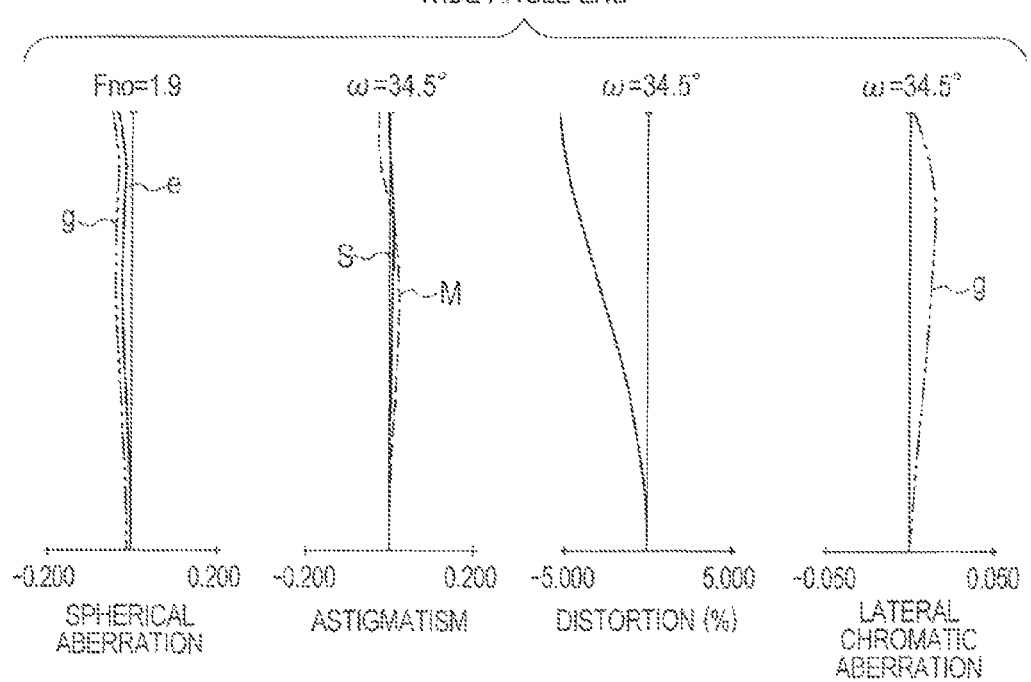
FIG. 10A is an aberration diagram at the wide angle end according to Embodiment 5 (Numerical Embodiment 5) (at an object distance of 2.5 m).
Figure 10B:
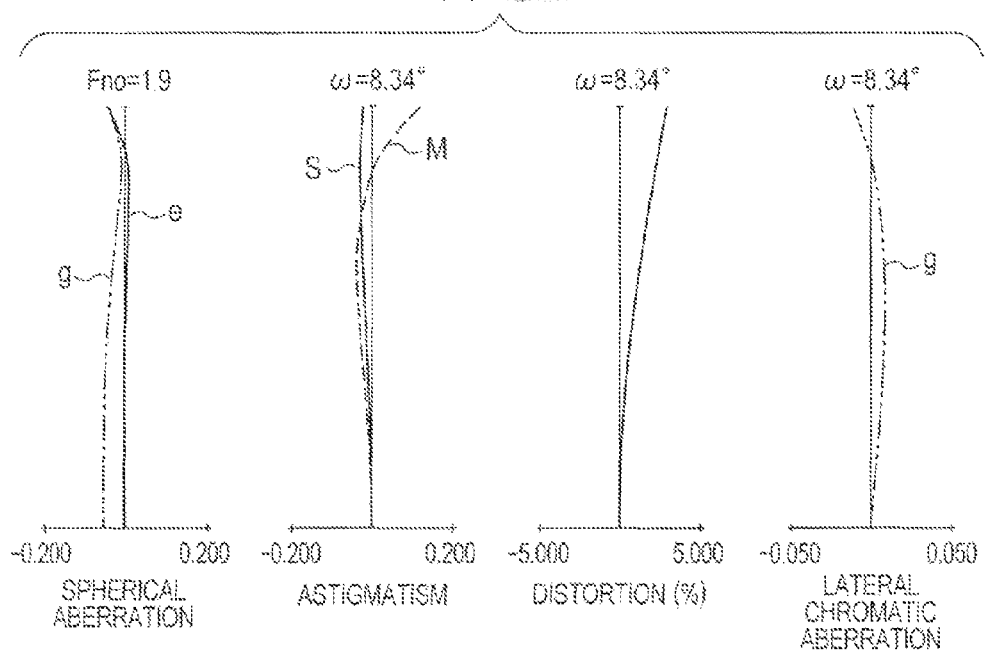
FIG. 10B is an aberration diagram at f=37.52 mm according to Embodiment 5 (Numerical Embodiment 5) (at an object distance of 2.5 m).
Figure 10C:
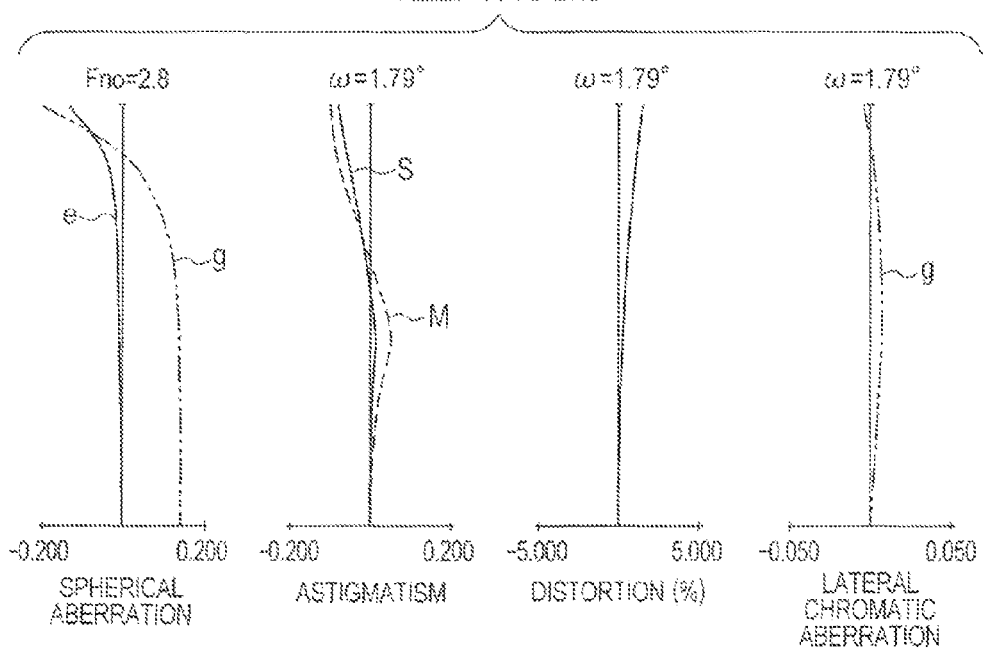
FIG. 10C is an aberration diagram at a telephoto end according to Embodiment 5 (Numerical Embodiment 5) (at an object distance of 2.5 m).

FIG. 9 is a lens cross-sectional view at a wide angle end according to Embodiment 5 of the present invention (at an object distance of infinity). FIGS. 10A, 10B, and 10C are aberration diagrams at the wide angle end, at a focal length f of an entire system of the zoom lens of 37.52 mm, and at a telephoto end, respectively, according to Embodiment 5 (at an object distance of 2.5 m). The zoom lens according to Embodiment 5 has a zoom ratio of 22.00, an F-number of from 1.90 to 2.80, and an angle of view of image taking of from 69.02° to 3.58°.

Figure 11:
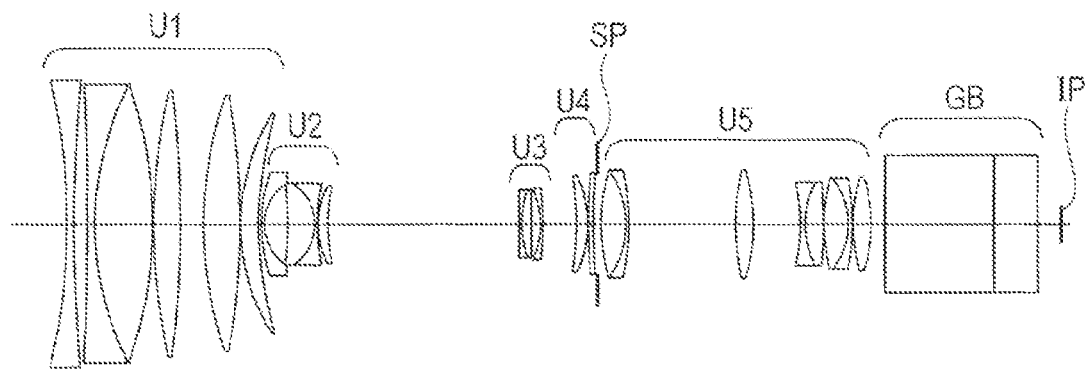
FIG. 11 is a lens cross-sectional view at a wide angle end according to Embodiment 6 (Numerical Embodiment 6) of the present invention.
Figure 12A:
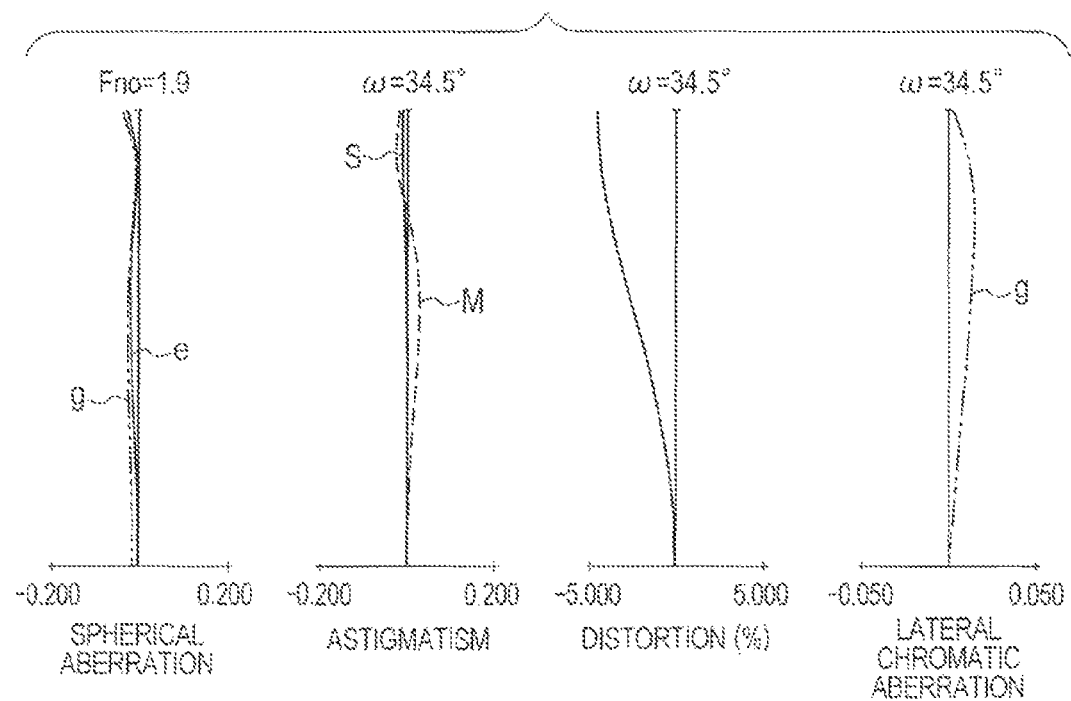
FIG. 12A is an aberration diagram at the wide angle end according to Embodiment 6 (Numerical Embodiment 6) (at an object distance of 2.5 m).
Figure 12B:
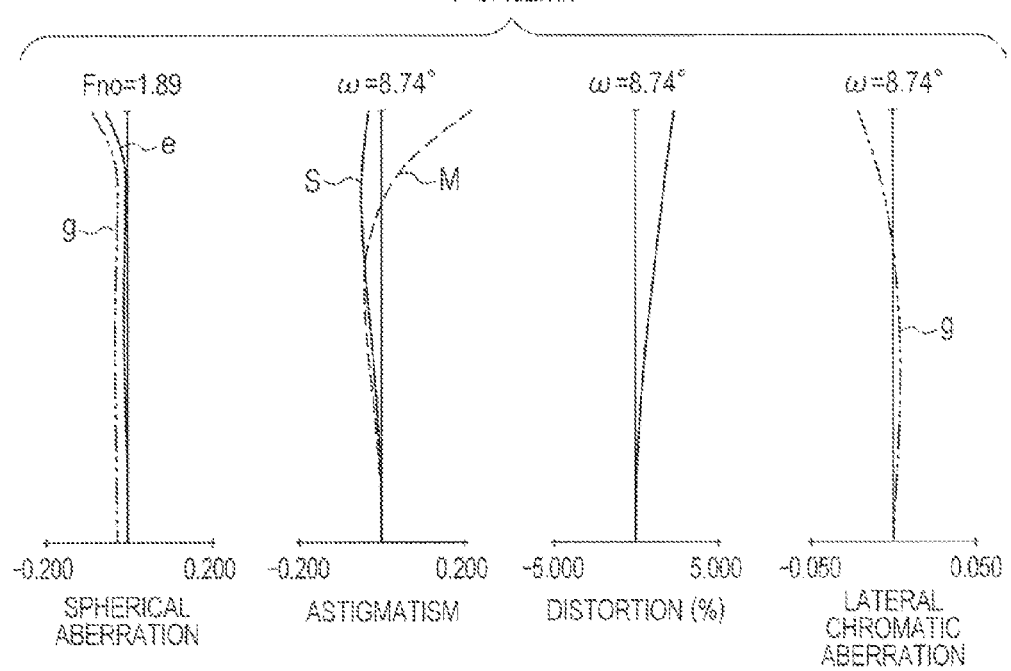
FIG. 12B is an aberration diagram at f=35.77 mm according to Embodiment 6 (Numerical Embodiment 6) (at an object distance of 2.5 m).
Figure 12C:
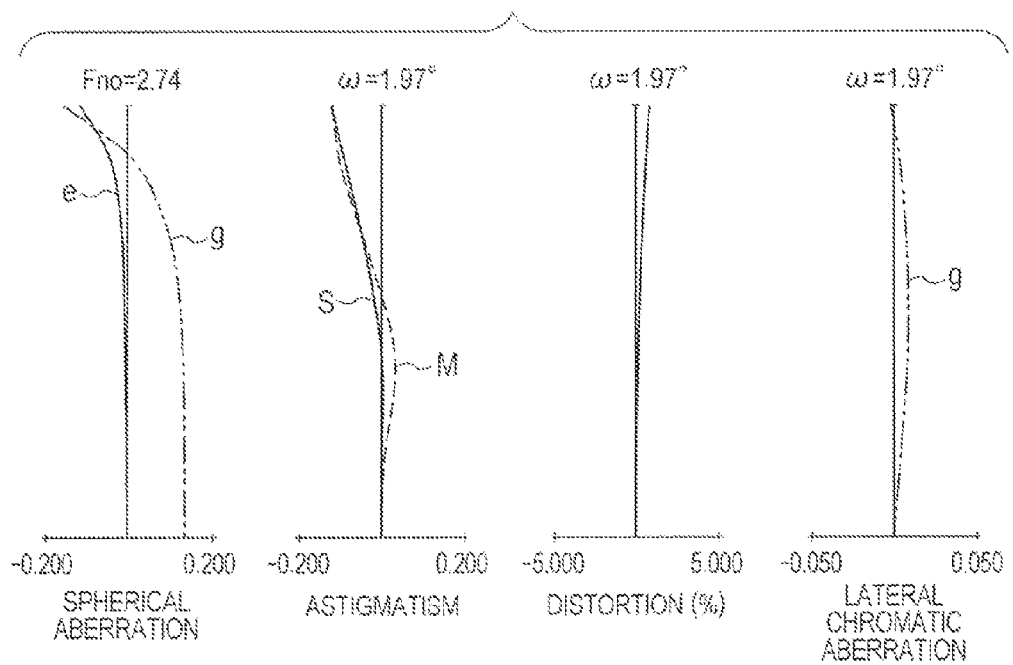
FIG. 12C is an aberration diagram at a telephoto end according to Embodiment 6 (Numerical Embodiment 6) (at an object distance of 2.5 m).

FIG. 11 is a lens cross-sectional view at a wide angle end according to Embodiment 6 of the present invention (at an object distance of infinity). FIGS. 12A, 12B, and 12C are aberration diagrams at the wide angle end, at a focal length f of an entire system of the zoom lens of 35.77 mm, and at a telephoto end, respectively, according to Embodiment 6 (at an object distance of 2.5 m). The zoom lens according to Embodiment 6 has a zoom ratio of 20.00, an F-number of from 1.90 to 2.74, and an angle of view of image taking of from 69.02° to 3.94°.

Figure 13:
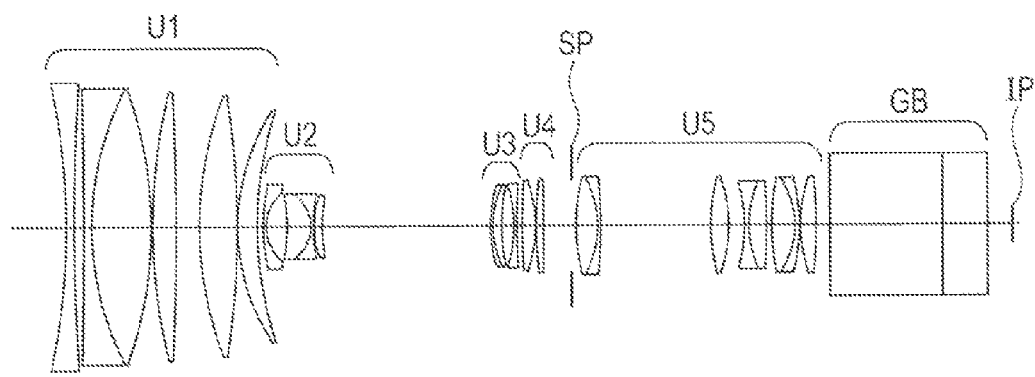
FIG. 13 is a lens cross-sectional view at a wide angle end according to Embodiment 7 (Numerical Embodiment 7) of the present invention.
Figure 14A:
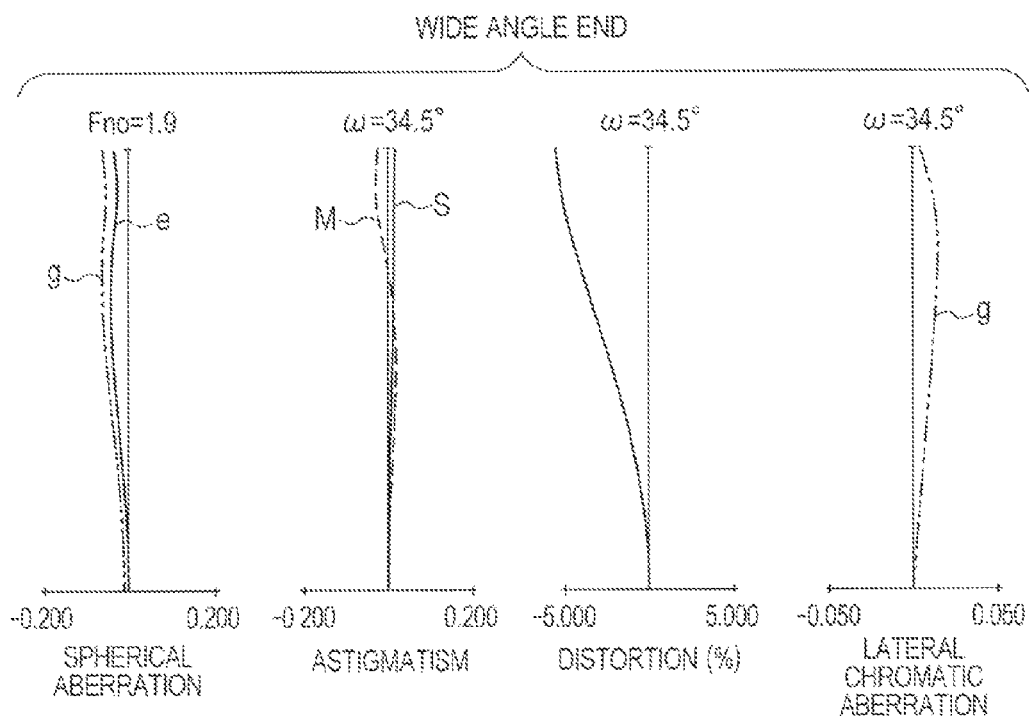
FIG. 14A is an aberration diagram at the wide angle end according to Embodiment 7 (Numerical Embodiment 7) (at an object distance of 2.5 m).
Figure 14B:
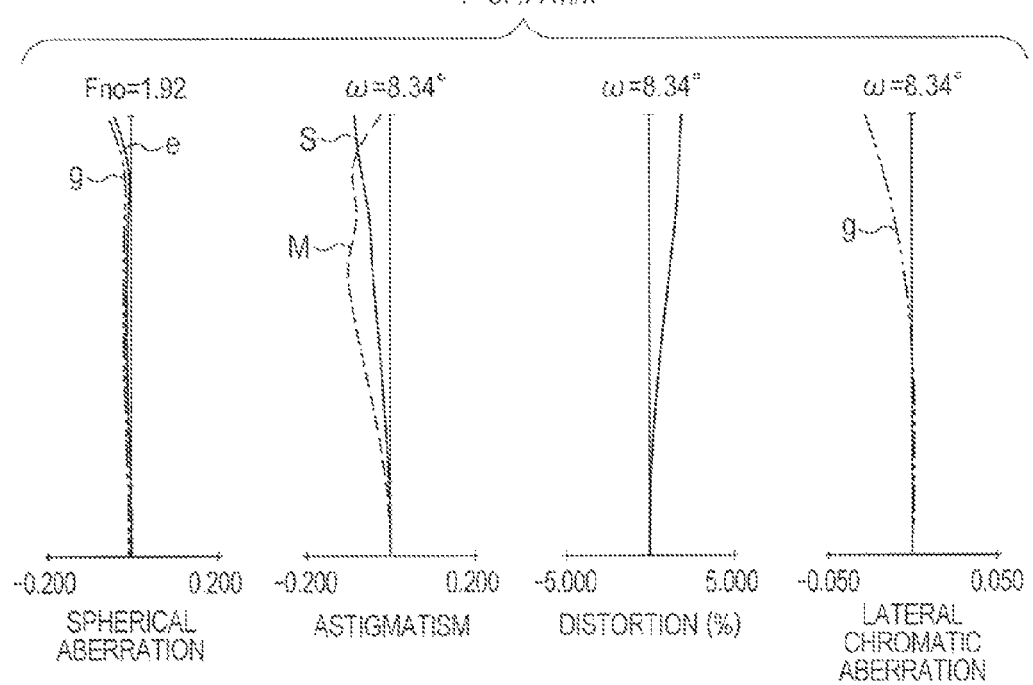
FIG. 14B is an aberration diagram at f=37.52 mm according to Embodiment 7 (Numerical Embodiment 7) (at an object distance of 2.5 m).
Figure 14C:
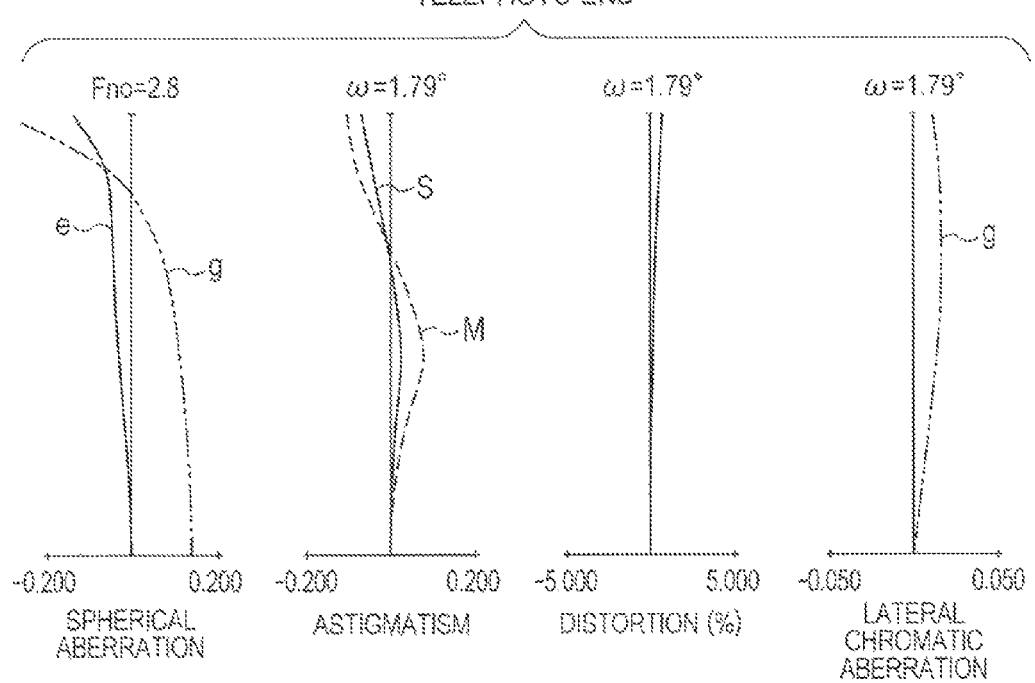
FIG. 14C is an aberration diagram at a telephoto end according to Embodiment 7 (Numerical Embodiment 7) (at an object distance of 2.5 m).

FIG. 13 is a lens cross-sectional view at a wide angle end according to Embodiment 7 of the present invention (at an object distance of infinity). FIGS. 14A, 14B, and 14C are aberration diagrams at the wide angle end, at a focal length f of an entire system of the zoom lens of 37.52 mm, and at a telephoto end, respectively, according to Embodiment 7 (at an object distance of 2.5 m). The zoom lens according to Embodiment 7 has a zoom ratio of 22.00, an F-number of from 1.90 to 2.80, and an angle of view of image taking of from 69.02° to 3.58°.

Figure 15:
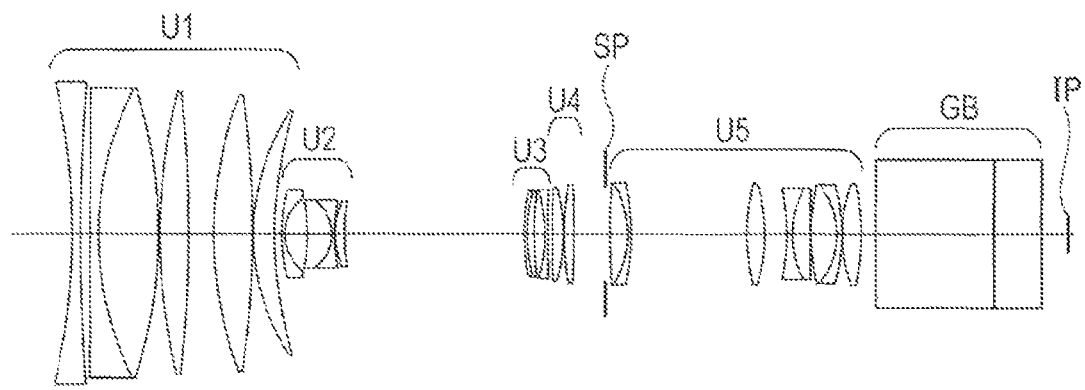
FIG. 15 is a lens cross-sectional view at a wide angle end according to Embodiment 8 (Numerical Embodiment 8) of the present invention.
Figure 16A:
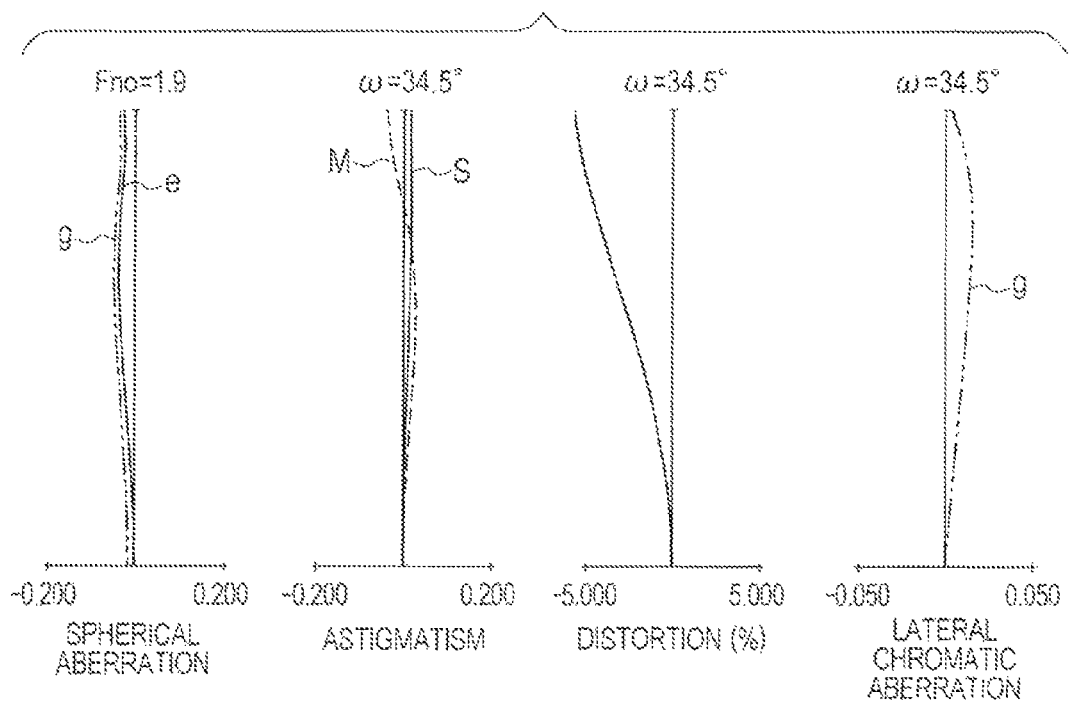
FIG. 16A is an aberration diagram at the wide angle end according to Embodiment 8 (Numerical Embodiment 8) (at an object distance of 2.5 m).
Figure 16B:
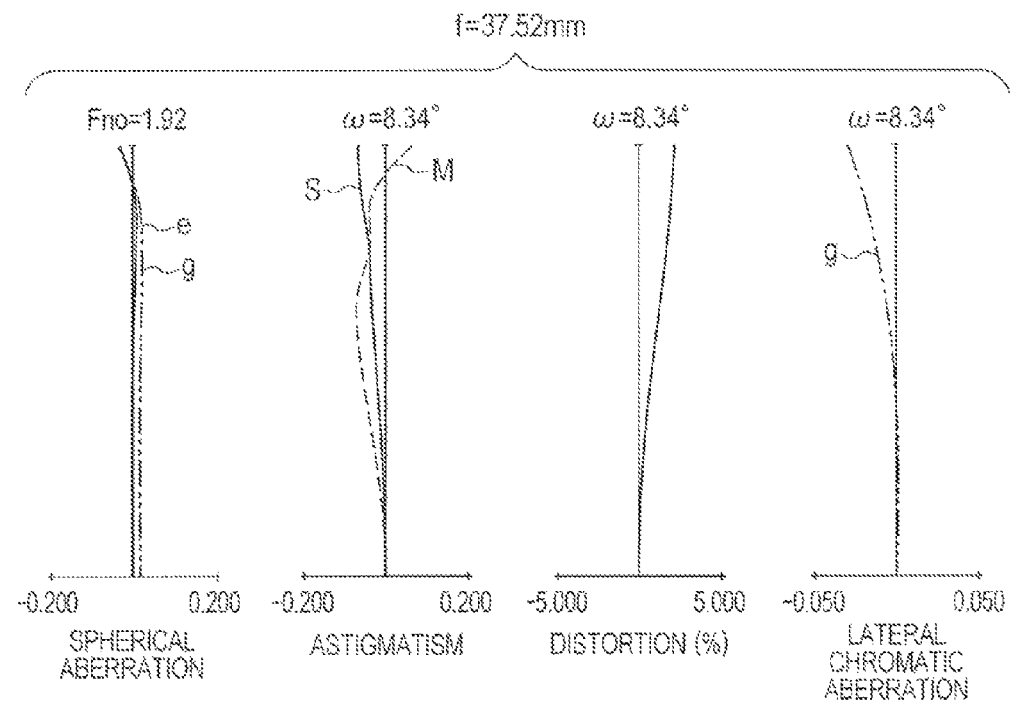
FIG. 16B is an aberration diagram at f=37.52 mm according to Embodiment 8 (Numerical Embodiment 8) (at an object distance of 2.5 m).
Figure 16C:
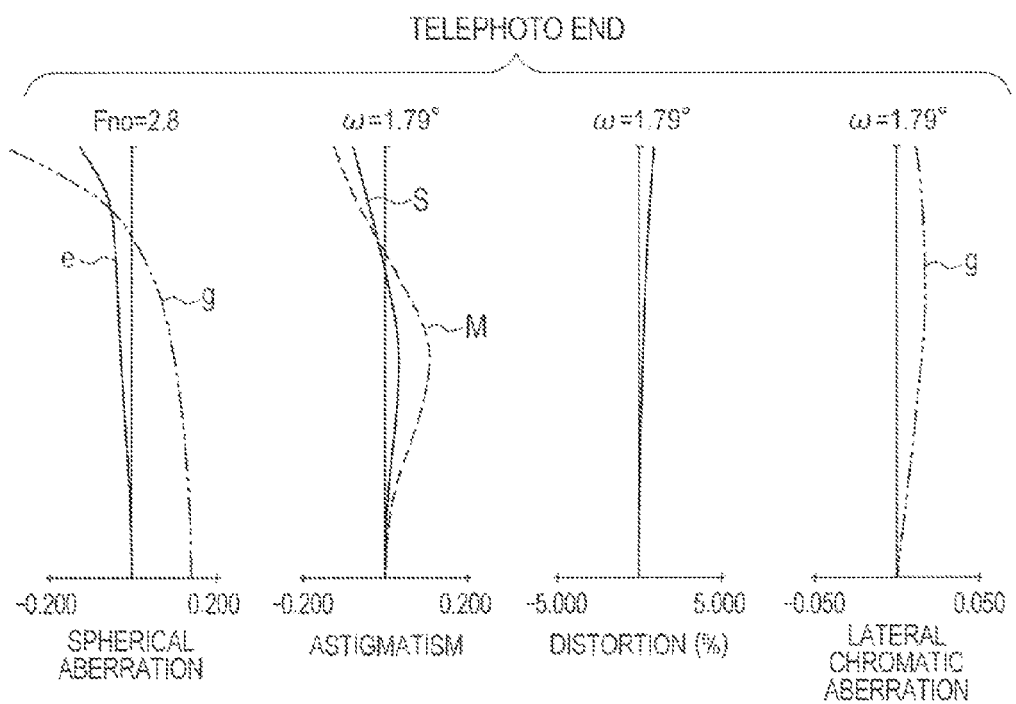
FIG. 16C is an aberration diagram at a telephoto end according to Embodiment 8 (Numerical Embodiment 8) (at an object distance of 2.5 m).
Figure 19:
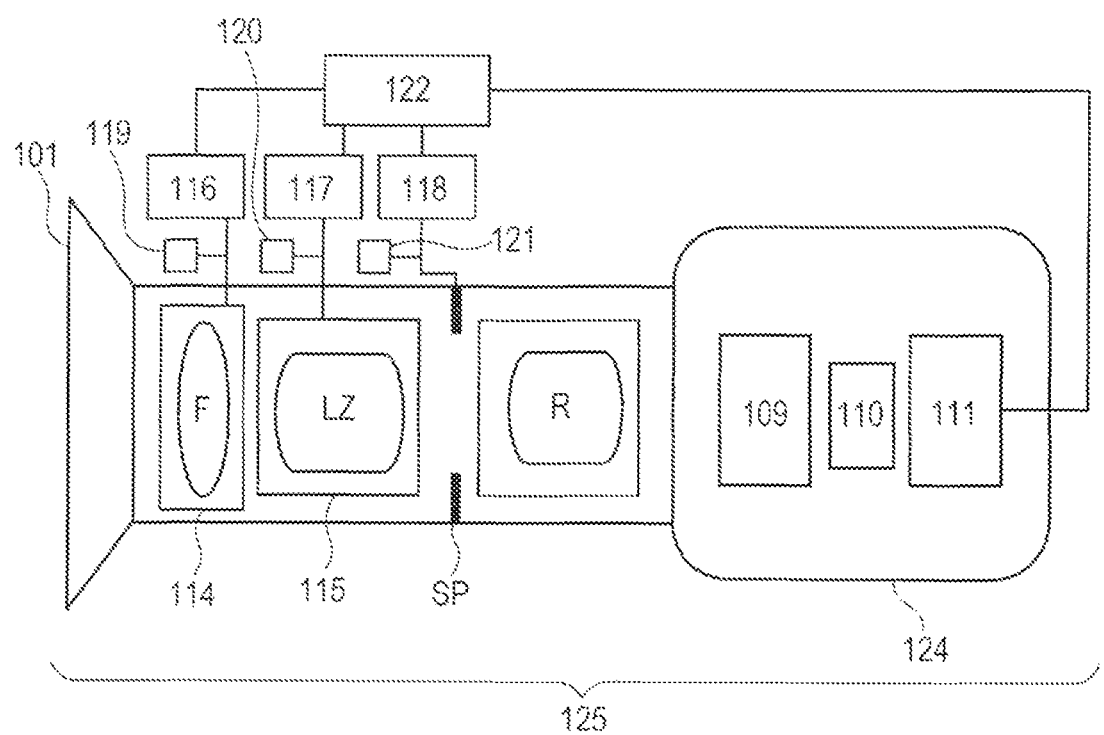
FIG. 19 is a schematic diagram of a main part of an image pickup apparatus according to the present invention.

FIG. 15 is a lens cross-sectional view at a wide angle end according to Embodiment 8 of the present invention (at an object distance of infinity). FIGS. 16A, 16B, and 16C are aberration diagrams at the wide angle end, at a focal length f of an entire system of the zoom lens of 37.52 mm, and at a telephoto end, respectively, according to Embodiment 8 (at an object distance of 2.5 m). The zoom lens according to Embodiment 8 has a zoom ratio of 22.00, an F-number of from 1.90 to 2.80, and an angle of view of image taking of from 69.02° to 3.58°. FIG. 17 is an explanatory diagram of zooming loci of a zoom lens according to the present invention. FIG. 18 is an explanatory diagram of zooming loci of the zoom lens according to the present invention. FIG. 19 is a schematic diagram of a main part of an image pickup apparatus according to the present invention.

In the lens cross-sectional views of FIGS. 1, 3, 5, and 7 according to Embodiments 1 to 4, a first lens unit U1 is configured not to move for zooming, and has a positive refractive power. The first lens unit U1 includes a lens system for focusing. The lens system for focusing is formed of at least a part of a lens system having a refractive power included in the first lens unit U1.

A second lens unit (variator lens unit) U2 is configured to move during the zooming, and has a negative refractive power. The second lens unit U2 is configured to move on an optical axis toward an image plane side, to thereby perform zooming from the wide angle end to the telephoto end. A third lens unit (compensator lens unit) U3 is configured to move during the zooming, and has a negative refractive power.

The third lens unit U3 is configured to move on the optical axis along a convex locus in conjunction with the movement of the second lens unit U2 during the zooming, to thereby correct image plane variation accompanying the zooming. An aperture stop SP is configured not to move for the zooming. A fourth lens unit (relay lens unit R) U4 is configured not to move for the zooming, and has a positive refractive power. A glass block GB is a prism or the like. The aperture stop SP is arranged between the third lens unit U3 and the fourth lens unit U4. An image plane IP corresponds to an image pickup surface of a solid-state image pickup element (photoelectric conversion element).

Each of the zoom lenses according to Embodiments 1 to 4 is a four-unit zoom lens including four lens units. FIG. 17 is an illustration of movement loci of the respective lens units during zooming from the wide angle end (W) to the telephoto end (T) in the four-unit zoom lenses according to Embodiments 1 to 4. In the lens cross-sectional views of FIGS. 9, 11, 13, and 15 according to Embodiments 5 to 8, a first lens unit U1 is configured not to move for zooming, and has a positive refractive power. The first lens unit U1 includes a lens system for focusing. The lens system for focusing is formed of at least a part of a lens system having a refractive power included in the first lens unit U1.

The second lens unit U2 is configured to move during the zooming, and has a negative refractive power. The third lens unit U3 is configured to move during the zooming, and has a negative refractive power. The second lens unit U2 and the third lens unit U3 are variator lens units configured to move on the optical axis, to thereby perform zooming from the wide angle end to the telephoto end. The fourth lens unit (compensator lens unit) U4 is configured to move during the zooming, and has a positive refractive power. The fourth lens unit U4 is configured to move on the optical axis in conjunction with the movement of the second lens unit U2 and the third lens unit U3, to thereby correct image plane variation accompanying the zooming.

An aperture stop SP is arranged. A fifth lens unit (relay lens unit R) U5 is configured not to move for the zooming, and has a positive refractive power. A glass block GB is a prism or the like. The aperture stop SP is arranged between the fourth lens unit U4 and the fifth lens unit U5. An image plane IP corresponds to an image pickup surface of a solid-state image pickup element (photoelectric conversion element). Each of the zoom lenses according to Embodiments 5 to 8 is a five-unit zoom lens including five lens units. FIG. 18 is an illustration of movement loci of the respective lens units during zooming from the wide angle end (W) to the telephoto end (T) in the five-unit zoom lenses according to Embodiments 5 to 8.

In the aberration diagrams, the solid line e and the two-dot chain line g in spherical aberration represent the spherical aberration for e-line (wavelength: 546.1 nm) and the spherical aberration for g-line (wavelength: 435.8 nm), respectively. The dotted line M and the solid line S in astigmatism represent a meridional image plane for the e-line and a sagittal image plane for the e-line, respectively. The two-dot chain line g in lateral chromatic aberration represents the lateral chromatic aberration for the g-line. Symbol Fno represents an F-number, and symbol ω represents a half angle of field (degree). In the aberration diagrams, the spherical aberration, the astigmatism, the distortion, and the lateral chromatic aberration are drawn at scales of 0.2 mm, 0.2 mm, 5%, and 0.05 mm, respectively.

Each of the four-unit zoom lenses according to Embodiments 1 to 4 includes, in order from the object side to the image side, the first lens unit U1 having the positive refractive power, which is configured not to move for zooming, the second lens unit U2 having the negative refractive power, which is configured to move during the zooming, the third lens unit U3 having the negative refractive power, which is configured to move along the locus convex to the object side during the zooming, the aperture stop SP, and the fourth lens unit U4 having the positive refractive power, which is configured not to move for the zooming.

The third lens unit U3 includes a cemented lens formed by cementing a single negative lens and a single positive lens, and a single negative lens and satisfies the following conditional expressions:

$$0.60 < |fn1/fp| < 0.97 \quad (1)$$

$$0.24 < \beta 3w < 0.53 \quad (2),$$

where fn1 represents a focal length of the negative lens included in the cemented lens, fp represents a focal length of the positive lens included in the cemented lens, and β3w represents a lateral magnification of the third lens unit U3 at the wide angle end.

Further, in each of the four-unit zoom lenses according to Embodiments 1 to 4, it is preferred to satisfy at least one of the following conditional expressions.

It is preferred to satisfy at least one of the following conditional expressions:

$$2.5 < f3/f2 < 6.5 \quad (3)$$

$$3.7 < |f1/f2| < 7.0 \quad (4)$$

$$3.5 < |f3/fw| < 11.0 \quad (5)$$

$$0.35 < fn1/fn2 < 1.50 \quad (6)$$

$$0.65 < Nn1/Np < 1.20 \quad (7)$$

$$1.4 < vn1/vp < 4.2 \quad (8)$$

where f1, f2 and f3 respectively represent focal lengths of the first lens unit U1, the second lens unit U2 and the third lens unit U3, fw represents a focal length of an entire system of the zoom lens at the wide angle end, fn2 represents a focal length of one of the negative lenses of the third lens unit U3 which is not included in the cemented lens, Nn1 and vn1 respectively represent a refractive index and an Abbe number of a material of the negative lens included in the cemented lens of the third lens unit U3, and Np and vp respectively represent a refractive index and an Abbe number of a material of the positive lens included in the cemented lens.

Each of the five-unit zoom lenses according to Embodiments 5 to 8 includes, in order from the object side to the image side, a first lens unit U1 having a positive refractive power, which is configured not to move for zooming, a second lens unit U2 having a negative refractive power, which is configured to move during the zooming, a third lens unit U3 having a negative refractive power, which is configured to move during the zooming, a fourth lens unit U4 having a positive refractive power, which is configured to move during the zooming, an aperture stop SP, and a fifth lens unit U5 having a positive refractive power, which is configured not to move for the zooming.

The third lens unit U3 includes a cemented lens formed by cementing a single negative lens and a single positive lens, and a single negative lens, and satisfies the following conditional expressions:

$$0.60 < |fn1x/fpx| < 3.5 \quad (1x)$$

$$0.24 < \beta 3wx < 0.53 \quad (2x),$$

where fn1x represents a focal length of the negative lens included in the cemented lens, fpx represents a focal length of the positive lens included in the cemented lens, and β3wx represents a lateral magnification of the third lens unit U3 at the wide angle end.

Further, in each of the five-unit zoom lenses according to Embodiments 5 to 8, it is preferred to satisfy at least one of the following conditional expressions:

$$2.5 < f3x/f2x < 7.5 \quad (3x);$$

$$3.7 < |f1x/f2x| < 7.0 \quad (4x);$$

$$3.5 < |f3x/fwx| < 11.0 \quad (5x);$$

$$0.4 < fn1x/fn2x < 8.0 \quad (6x);$$

$$0.65 < Nn1x/Npx < 1.20 \quad (7x); \text{ and}$$

$$1.4 < vn1x/vpx < 4.2 \quad (8x),$$

where f1x, f2x, f3x and fwx respectively represents focal lengths of the first lens unit U1, the second lens unit U2, the third lens unit U3 and an entire system of the zoom lens at the wide angle end, fn2x represents a focal length of one of the negative lenses of the third lens unit U3 which is not included in the cemented lens, Nn1x and vn1x respectively represent a refractive index and an Abbe number of a material of the negative lens included in the cemented lens of the third lens unit U3, and Npx and vpx respectively represent a refractive index and an Abbe number of a material of the positive lens included in the cemented lens.

The conditional expressions (1) to (8) are defined when the zoom lens is the four-unit zoom lens having the above-mentioned configuration. On the other hand, the conditional expressions (1x) to (8x) are defined when the zoom lens is the five-unit zoom lens having the above-mentioned configuration. The conditional expressions (1) to (8) and the conditional expressions (1x) to (8x) differ only in that the corresponding zoom lens includes four lens units or five lens units and that the numerical ranges of a part of the conditional expressions are different, and hence the corresponding conditional expressions have the same technical meanings.

Next, technical meanings of the conditional expressions (1) to (8) are described. Technical meanings of the conditional expressions (1x) to (8x) are the same as those of the conditional expressions (1) to (8). The conditional expressions (1) and (2) are satisfied in order to obtain high optical performance in the entire zoom range, in particular, in a range from the wide angle end to an intermediate zoom position. Spherical aberration and spherochromatic aberration, which affect the optical performance in the vicinity of the center of an image plane in the zoom lens of each of Embodiments, are now described. In the entire zoom range of the zoom lens, in order to obtain high optical performance in the range from the center of the image plane to the vicinity of the image plane, a variation in spherical aberration at the center of the image plane and image plane variation in the vicinity of the image plane accompanying zooming need to be reduced as much as possible.

In the above-mentioned four-unit or five-unit zoom lens of positive lead type, when the zoom ratio is increased, a variation in incident height of an axial ray on the third lens unit U3 tends to be larger in the range from the wide angle end to the intermediate zoom position. Specifically, the incident height of the axial ray becomes smaller at the intermediate zoom position than at the wide angle end, and the influence of the third lens unit U3 on the aberration is reduced. As a result, the variation in spherochromatic aberration affecting the optical performance at the center of the image plane is increased.

When the third lens unit U3 is formed of two or less lenses, large spherochromatic aberration is generated on the positive side due to the third lens unit U3. Thus, it is difficult to reduce the variation in spherochromatic aberration while achieving a high zoom ratio. Therefore, in each of Embodiments, the third lens unit U3 is formed of three lenses, and the configurations, the focal lengths, and the like of the respective lenses are appropriately set. Consequently, the generation of aberration from the third lens unit U3 is reduced, to thereby reduce the variation in aberration over the entire zoom range.

When the value of |fn1/fp| falls below the lower limit of the conditional expression (1) so that the negative refractive power of the negative lens included in the cemented lens is strong (the absolute value of the negative refractive power is large), the curvature radius of the cemented lens surface is small. Accordingly, the variations in spherical aberration and spherochromatic aberration are increased in the range from the wide angle end to the intermediate zoom position. When the value of |fn1/fp| exceeds the upper limit of the conditional expression (1) so that the negative refractive power of the negative lens included in the cemented lens is weak (the absolute value of the negative refractive power is small), it is difficult to correct various aberrations at the wide angle end.

When the value of β3w falls below the lower limit of the conditional expression (2), the amount of movement of the third lens unit U3 during zooming is large, and the variations in spherical aberration and spherochromatic aberration are increased in the range from the wide angle end to the intermediate zoom position. When the value of β3w exceeds the upper limit of the conditional expression (2), it is difficult to reduce the total lens length while achieving a high zoom ratio. The conditional expression (3) relates to the ratio between the focal length of the second lens unit U2 and the focal length of the third lens unit U3, and is satisfied in order to satisfactorily correct aberration in the entire zoom range and reduce the total lens length while achieving a high zoom ratio.

When the value of f3/f2 exceeds the upper limit of the conditional expression (3) so that the negative refractive power of the third lens unit U3 is small, the amount of movement of the third lens unit U3 during zooming is large, and it is difficult to reduce the variation in spherochromatic aberration in the range from the wide angle end to the intermediate zoom position. Further, the negative refractive power of the second lens unit U2 is large, and it is difficult to reduce aberration variation accompanying zooming. When the value of f3/f2 falls below the lower limit of the conditional expression (3) so that the negative refractive power of the second lens unit U2 is small, it is difficult to reduce the total lens length while achieving a high zoom ratio.

The conditional expression (4) relates to the ratio between the focal length of the first lens unit U1 and the focal length of the second lens unit U2, and is satisfied in order to satisfactorily correct various aberrations in the entire zoom range while achieving a high zoom ratio and downsizing the entire system of the zoom lens. When the value of |f1/f2| falls below the lower limit of the conditional expression (4) so that the negative refractive power of the second lens unit U2 is small, it is difficult to reduce the total lens length while achieving a high zoom ratio. When the value of |f1/f2| exceeds the upper limit of the conditional expression (4) so that the positive refractive power of the first lens unit U1 is small, the first lens unit U1 is upsized, and it is difficult to downsize the entire system of the zoom lens. Further, the negative refractive power of the second lens unit U2 is large, and it is difficult to reduce aberration variation accompanying zooming.

The conditional expression (5) relates to the ratio between the focal length of the entire system of the zoom lens and the focal length of the third lens unit U3 at the wide angle end, and is satisfied in order to satisfactorily correct various aberrations in the entire zoom range and reduce the total lens length while achieving a high zoom ratio.

When the value of |f3/fw| exceeds the upper limit of the conditional expression (5) so that the negative refractive power of the third lens unit U3 is small, the amount of movement of the third lens unit U3 is large during zooming. Accordingly, it is difficult to reduce variation suppression in spherochromatic aberration in the range from the wide angle end to the intermediate zoom position. When the value of |f3/fw| falls below the lower limit of the conditional expression (5) so that the negative refractive power of the third lens unit U3 is large, the distance between an object point with respect to the third lens unit U3 and the third lens unit U3 is reduced, and hence the second lens unit U2 and the third lens unit U3 interfere with each other in the range from the intermediate zoom position to the telephoto end, which is not preferred.

The conditional expression (6) relates to the ratio of negative refractive powers of the two negative lenses included in the third lens unit U3, and is satisfied in order to satisfactorily correct spherical aberration, spherochromatic aberration, and the like in the range from the wide angle end to the intermediate zoom position. When the value of fn1/fn2 falls below the lower limit of the conditional expression (6) so that the negative refractive power of the negative lens included in the cemented lens is strong, the curvature of the cemented lens surface is small, and hence the variations in spherical aberration and spherochromatic aberration are increased in the range from the wide angle end to the intermediate zoom position. When the value of fn1/fn2 exceeds the upper limit of the conditional expression (6) so that the negative refractive power of the negative lens included in the cemented lens is weak, it is difficult to correct aberration at the wide angle end.

The conditional expressions (7) and (8) relate to the ratios of the refractive indices and the Abbe numbers of the materials of the negative lens and the positive lens included in the cemented lens of the third lens unit U3, and are satisfied in order to satisfactorily correct spherical aberration, spherochromatic aberration, and the like in the range from the wide angle end to the intermediate zoom position.

In this case, the Abbe number ν of the material is expressed by:

$$\nu=(Nd-1)/(NF-NC),$$

where Ng represents a refractive index for the g-line, NF represents a refractive index for the F-line, Nd represents a refractive index for the d-line, and NC represents a refractive index for the C-line.

When the value of Nn1/Np exceeds the upper limit of the conditional expression (7) so that the refractive index of the material of the negative lens included in the cemented lens is large or the refractive index of the material of the positive lens included in the cemented lens is small, large spherical aberration is generated at the cemented lens surface on the positive side, and the variation in spherical aberration is increased in the range from the wide angle end to the intermediate zoom position. When the value of Nn1/Np falls below the lower limit of the conditional expression (7) so that the refractive index of the material of the negative lens included in the cemented lens is small or the refractive index of the material of the positive lens included in the cemented lens is large, the Petzval sum is increased and various aberrations are increased, with the result that it is difficult to correct the various aberrations at the wide angle end.

When the value of νn1/νp exceeds the upper limit of the conditional expression (8) so that the dispersion of the material of the negative lens included in the cemented lens is small or the dispersion of the material of the positive lens included in the cemented lens is large, large spherochromatic aberration is generated at the cemented lens surface on the negative side. As a result, the variation in spherochromatic aberration is increased in the range from the wide angle end to the intermediate zoom position. When the value of νn1/νp falls below the lower limit of the conditional expression (8) so that the dispersion of the material of the negative lens included in the cemented lens is large or the dispersion of the material of the positive lens included in the cemented lens is small, a dispersion difference between the materials of the positive lens and the negative lens is small. The refractive powers of the positive lens and the negative lens are then excessively large, with the result that it is difficult to correct the various aberrations at the wide angle end.

According to the present invention having the configurations described above, the zoom lens having a wide angle of field, a high zoom ratio, and high optical performance over the entire zoom range can be obtained. It is more preferred to set the numerical ranges of the conditional expressions (1) to (8) as follows.

$$0.65<|fn1/fp|<0.95 \tag{1a}$$

$$0.27<\beta 3w<0.50 \tag{2a}$$

$$2.55<f3/f2<6.00 \tag{3a}$$

$$3.9<|f1/f2|<6.5 \tag{4a}$$

$$4.0<|f3/fw1<10.0 \tag{5a}$$

$$0.40<fn1/fn2<1.30 \tag{6a}$$

$$0.75<Nn1/Np<1.10 \tag{7a}$$

$$1.6<\nu n1/\nu p<3.9 \tag{8a}$$

It is preferred that the third lens unit U3 include, in order from the object side to the image side, a cemented lens formed by cementing a negative lens and a positive lens, and a negative lens. In this case, it is preferred that a cemented lens surface of the cemented lens have a shape convex to the object side. With this, spherical aberration, spherochromatic aberration, and the like at the wide angle end are easily satisfactorily corrected. Further, an incident height of an axial ray on the negative lens closest to the image side becomes higher than that of the axial ray on the negative lens closest to the object side.

In view of the above, an appropriate material based on the difference in incident height of the axial ray is employed for the negative lens. Thus, spherical aberration and chromatic aberration in the third lens unit U3 are satisfactorily corrected. Then, spherical aberration, spherochromatic aberration, and the like are satisfactorily corrected in the range from the wide angle end to the intermediate zoom position. The technical meanings of the conditional expressions (1x) to (8x) in the five-unit zoom lens are the same as those of the conditional expressions (1) to (8) in the four-unit zoom lens. In the five-unit zoom lens, it is more preferred to set the numerical ranges of the conditional expressions (1x) to (8x) as follows.

$$0.65<|fn1x/fpx|<3.30 \tag{1xa}$$

$$0.27<\beta 3wx<0.50 \tag{2xa}$$

$$2.55<\beta 3x/f2x<7.00 \tag{3xa}$$

$$3.9<|f1x/f2x|<6.5 \tag{4xa}$$

$$4.0<|f3x/fwx|<10.0 \tag{5xa}$$

$0.5 < fn1x/fn2x < 7.0$ (6xa)

$0.75 < Nn1x/Npx < 1.10$ (7xa)

$1.6 < vn1x/vpx < 3.9$ (8xa)

Also in the five-unit zoom lens, similarly to the four-unit zoom lens, it is preferred that the third lens unit U3 include, in order from the object side to the image side, a cemented lens formed by cementing a negative lens and a positive lens, and a negative lens. In this case, it is preferred that a cemented lens surface of the cemented lens have a shape convex to the object side. With this, spherical aberration, spherochromatic aberration, and the like at the wide angle end are easily satisfactorily corrected. Further, an incident height of an axial ray on the negative lens closest to the image side becomes higher than that of the axial ray on the negative lens closest to the object side.

In view of the above, an appropriate material based on the difference in incident height of the axial ray is employed for the negative lens. Thus, spherical aberration and chromatic aberration in the third lens unit U3 are satisfactorily corrected. Then, spherical aberration, spherochromatic aberration, and the like are satisfactorily corrected in the range from the wide angle end to the intermediate zoom position.

Next, Numerical Embodiments 1 to 8 corresponding to Embodiments 1 to 8 of the present invention are shown below. In each Numerical Embodiment, i represents the order of a surface from the object side, ri represents a curvature radius of an i-th surface from the object side, di represents an interval between the i-th surface and the (i+1)th surface from the object side, and ndi and vdi respectively represent a refractive index and an Abbe number of an optical member between the i-th surface and the (i+1)th surface. BF represents a back focus. The back focus BF is a value in air conversion from a final lens surface to an image plane. A total lens length is a value obtained by adding the air-converted back focus to a distance from the first lens surface to the final lens surface. Correspondence between each Embodiment and each conditional expression described above is shown in Table 1.

(Numerical Embodiment 1)

Unit mm

Surface data

| Surface number | r | d | nd | vd | Effective diameter |
|---|---|---|---|---|---|
| 1 | −202.659 | 2.30 | 1.80100 | 35.0 | 86.14 |
| 2 | 117.369 | 0.92 | | | 83.19 |
| 3 | 114.415 | 11.74 | 1.49700 | 81.5 | 83.49 |
| 4 | −614.877 | 0.40 | | | 83.24 |
| 5 | 398.957 | 2.40 | 1.72047 | 34.7 | 82.38 |
| 6 | 103.270 | 0.10 | | | 80.77 |
| 7 | 104.460 | 14.84 | 1.48749 | 70.2 | 80.76 |
| 8 | −191.478 | 0.15 | | | 80.73 |
| 9 | 1,890.085 | 4.90 | 1.48749 | 70.2 | 79.59 |
| 10 | −311.781 | 6.76 | | | 79.26 |
| 11 | 119.116 | 9.55 | 1.61800 | 63.3 | 75.99 |
| 12 | −527.536 | 0.15 | | | 75.13 |
| 13 | 70.475 | 7.80 | 1.77250 | 49.6 | 68.80 |
| 14 | 189.193 | (Variable) | | | 67.50 |
| 15 | 56.273 | 0.90 | 1.88300 | 40.8 | 25.31 |
| 16 | 13.284 | 6.55 | | | 20.13 |
| 17 | −62.882 | 7.10 | 1.80809 | 22.8 | 19.45 |
| 18 | −13.104 | 0.70 | 1.88300 | 40.8 | 18.83 |
| 19 | 67.554 | 0.20 | | | 18.46 |
| 20 | 24.541 | 2.62 | 1.66680 | 33.0 | 18.62 |
| 21 | 48.296 | (Variable) | | | 18.20 |
| 22 | −34.073 | 0.75 | 1.88300 | 40.8 | 21.20 |
| 23 | 93.479 | 3.09 | 1.84666 | 23.8 | 22.58 |
| 24 | −57.290 | 1.71 | | | 23.14 |
| 25 | −32.926 | 0.75 | 1.69680 | 55.5 | 23.50 |
| 26 | −152.454 | (Variable) | | | 24.94 |
| 27 (Stop) | ∞ | 1.30 | | | 28.10 |
| 28 | −391.325 | 4.45 | 1.63854 | 55.4 | 29.08 |
| 29 | −32.290 | 0.15 | | | 29.72 |
| 30 | 89.284 | 4.94 | 1.51633 | 64.1 | 31.28 |
| 31 | −59.350 | 0.15 | | | 31.39 |
| 32 | 48.650 | 8.30 | 1.51742 | 52.4 | 30.57 |
| 33 | −33.492 | 0.90 | 1.83481 | 42.7 | 29.78 |
| 34 | 139.374 | 32.40 | | | 29.30 |
| 35 | 58.014 | 5.93 | 1.49700 | 81.5 | 29.55 |
| 36 | −41.711 | 2.65 | | | 29.32 |
| 37 | −347.758 | 1.40 | 1.83403 | 37.2 | 25.74 |
| 38 | 24.386 | 4.80 | 1.48749 | 70.2 | 24.61 |
| 39 | 110.582 | 0.10 | | | 24.65 |
| 40 | 51.849 | 7.92 | 1.50127 | 56.5 | 24.77 |
| 41 | −19.411 | 1.40 | 1.83481 | 42.7 | 24.62 |
| 42 | −96.986 | 3.07 | | | 25.76 |
| 43 | 60.405 | 5.24 | 1.50127 | 56.5 | 26.85 |
| 44 | −44.153 | 4.00 | | | 26.81 |
| 45 | ∞ | 33.00 | 1.60859 | 46.4 | 40.00 |
| 46 | ∞ | 13.20 | 1.51633 | 64.1 | 40.00 |
| 47 | ∞ | 7.66 | | | 40.00 |
| Image plane | ∞ | | | | |

Various data
Zoom ratio 22.00

| | Wide angle | Intermediate | Telephoto |
|---|---|---|---|
| Focal length | 8.00 | 37.52 | 176.00 |
| F-number | 1.90 | 1.90 | 2.80 |
| Half angle of field (degree) | 34.51 | 8.34 | 1.79 |
| Image height | 5.50 | 5.50 | 5.50 |
| Total lens length | 275.31 | 275.31 | 275.31 |
| BF | 40.88 | 40.88 | 40.88 |
| d14 | 1.85 | 40.47 | 55.39 |
| d21 | 58.28 | 15.23 | 6.70 |
| d26 | 2.80 | 7.24 | 0.85 |
| Position of Entrance pupil | 53.59 | 206.74 | 661.99 |
| Position of Exit pupil | 424.64 | 424.64 | 424.64 |
| Position of Front principal point | 61.74 | 247.64 | 912.28 |
| Position of Rear principal point | −0.34 | −29.86 | −168.34 |

Zoom lens unit data

| Unit | First surface | Focal length | Lens structure length | Front principal point position | Rear principal point position |
|---|---|---|---|---|---|
| 1 | 1 | 70.10 | 62.02 | 38.28 | 3.01 |
| 2 | 15 | −13.01 | 18.07 | 2.66 | −9.36 |
| 3 | 22 | −35.09 | 6.30 | 1.03 | −3.07 |
| 4 | 27 | 64.15 | 135.30 | 72.01 | −163.27 |

Single lens data

| Lens | First surface | Focal length |
|---|---|---|
| 1 | 1 | −91.87 |
| 2 | 3 | 194.57 |
| 3 | 5 | −192.75 |
| 4 | 7 | 140.49 |
| 5 | 9 | 547.54 |
| 6 | 11 | 157.54 |
| 7 | 13 | 140.65 |
| 8 | 15 | −19.77 |

-continued

Unit mm

| | | |
|---|---|---|
| 9 | 17 | 19.05 |
| 10 | 18 | -12.31 |
| 11 | 20 | 71.14 |
| 12 | 22 | -28.04 |
| 13 | 23 | 41.94 |
| 14 | 25 | -60.17 |
| 15 | 28 | 54.61 |
| 16 | 30 | 69.58 |
| 17 | 32 | 39.53 |
| 18 | 33 | -32.09 |
| 19 | 35 | 49.66 |
| 20 | 37 | -27.10 |
| 21 | 38 | 62.81 |
| 22 | 40 | 29.14 |
| 23 | 41 | -29.15 |
| 24 | 43 | 51.54 |
| 25 | 45 | 0.00 |
| 26 | 46 | 0.00 |

(Numerical Embodiment 2)

Unit mm

Surface data

| Surface number | r | d | nd | vd | Effective diameter |
|---|---|---|---|---|---|
| 1 | -239.015 | 2.30 | 1.80100 | 35.0 | 86.04 |
| 2 | 136.842 | 3.78 | | | 83.06 |
| 3 | 141.172 | 11.21 | 1.49700 | 81.5 | 83.36 |
| 4 | -356.361 | 0.40 | | | 82.99 |
| 5 | -339.174 | 2.40 | 1.72047 | 34.7 | 82.89 |
| 6 | 115.554 | 0.10 | | | 81.73 |
| 7 | 117.042 | 15.51 | 1.48749 | 70.2 | 81.73 |
| 8 | -149.741 | 0.15 | | | 81.77 |
| 9 | -2,032.596 | 5.65 | 1.48749 | 70.2 | 81.11 |
| 10 | -201.489 | 6.63 | | | 80.99 |
| 11 | 124.710 | 11.08 | 1.61800 | 63.3 | 77.83 |
| 12 | -257.368 | 0.15 | | | 77.16 |
| 13 | 63.381 | 7.62 | 1.77250 | 49.6 | 71.13 |
| 14 | 126.414 | (Variable) | | | 69.83 |
| 15 | 57.405 | 0.90 | 1.88300 | 40.8 | 29.29 |
| 16 | 15.439 | 6.37 | | | 23.54 |
| 17 | -132.151 | 7.97 | 1.80809 | 22.8 | 23.30 |
| 18 | -14.718 | 0.70 | 1.88300 | 40.8 | 22.55 |
| 19 | 56.376 | 0.20 | | | 21.70 |
| 20 | 25.196 | 2.98 | 1.66680 | 33.0 | 21.90 |
| 21 | 51.307 | (Variable) | | | 21.40 |
| 22 | 613.351 | 1.50 | 1.77250 | 49.6 | 17.38 |
| 23 | 31.429 | 2.66 | 1.69895 | 30.1 | 17.66 |
| 24 | 286.245 | 2.81 | | | 17.86 |
| 25 | -24.383 | 1.50 | 1.65160 | 58.5 | 18.12 |
| 26 | -81.977 | (Variable) | | | 19.39 |
| 27 (Stop) | ∞ | 1.30 | | | 27.46 |
| 28 | -536.027 | 3.39 | 1.63854 | 55.4 | 28.17 |
| 29 | -50.427 | 0.15 | | | 28.76 |
| 30 | 109.207 | 2.48 | 1.51633 | 64.1 | 29.67 |
| 31 | 187.033 | 0.15 | | | 29.85 |
| 32 | 40.992 | 8.35 | 1.51742 | 52.4 | 30.38 |
| 33 | -36.668 | 0.90 | 1.83481 | 42.7 | 30.09 |
| 34 | -192.454 | 32.40 | | | 30.26 |
| 35 | 68.741 | 5.16 | 1.49700 | 81.5 | 28.74 |
| 36 | -46.983 | 8.12 | | | 28.50 |
| 37 | -41.146 | 1.40 | 1.83403 | 37.2 | 23.06 |
| 38 | 31.288 | 5.47 | 1.48749 | 70.2 | 23.50 |
| 39 | -84.250 | 0.05 | | | 24.24 |
| 40 | 53.421 | 6.50 | 1.50127 | 56.5 | 25.05 |
| 41 | -27.560 | 1.40 | 1.83481 | 42.7 | 25.16 |
| 42 | -62.362 | 0.15 | | | 25.87 |
| 43 | 33.431 | 4.26 | 1.50127 | 56.5 | 26.14 |
| 44 | -2,064.570 | 4.00 | | | 25.77 |
| 45 | ∞ | 33.00 | 1.60859 | 46.4 | 40.00 |
| 46 | ∞ | 13.20 | 1.51633 | 64.1 | 40.00 |
| 47 | ∞ | 7.42 | | | 40.00 |
| Image plane | ∞ | | | | |

Various data
Zoom ratio 22.00

| | Wide angle | Intermediate | Telephoto |
|---|---|---|---|
| Focal length | 8.00 | 37.52 | 176.00 |
| F-number | 1.90 | 1.89 | 2.80 |
| Half angle of field (degree) | 34.51 | 8.34 | 1.79 |
| Image height | 5.50 | 5.50 | 5.50 |
| Total lens length | 282.68 | 282.68 | 282.68 |
| BF | 40.64 | 40.64 | 40.64 |
| d14 | 0.80 | 40.61 | 55.38 |
| d21 | 52.99 | 8.43 | 9.04 |
| d26 | 12.04 | 16.79 | 1.41 |
| Position of Entrance pupil | 55.08 | 201.26 | 632.46 |
| Position of Exit pupil | 410.44 | 410.44 | 410.44 |
| Position of Front principal point | 63.24 | 242.28 | 885.32 |
| Position of Rear principal point | -0.58 | -30.10 | -168.58 |

Zoom lens unit data

| Unit | First surfaces | Focal length | Lens structure length | Front principal point position | Rear principal point position |
|---|---|---|---|---|---|
| 1 | 1 | 68.63 | 66.99 | 42.80 | 6.87 |
| 2 | 15 | -16.51 | 19.13 | 2.87 | -9.62 |
| 3 | 22 | -44.84 | 8.47 | 4.41 | -1.70 |
| 4 | 27 | 59.12 | 131.82 | 66.53 | -120.35 |

Single lens data

| Lens | First surface | Focal length |
|---|---|---|
| 1 | 1 | -107.62 |
| 2 | 3 | 204.39 |
| 3 | 5 | -118.56 |
| 4 | 7 | 136.92 |
| 5 | 9 | 456.78 |
| 6 | 11 | 136.94 |
| 7 | 13 | 155.54 |
| 8 | 15 | -24.02 |
| 9 | 17 | 19.69 |
| 10 | 18 | -13.08 |
| 11 | 20 | 70.48 |
| 12 | 22 | -42.73 |
| 13 | 23 | 49.91 |
| 14 | 25 | -53.60 |
| 15 | 28 | 86.56 |
| 16 | 30 | 500.95 |
| 17 | 32 | 38.66 |
| 18 | 33 | -54.10 |
| 19 | 35 | 56.83 |
| 20 | 37 | -20.99 |
| 21 | 38 | 47.38 |
| 22 | 40 | 37.12 |
| 23 | 41 | -59.93 |
| 24 | 43 | 65.40 |
| 25 | 45 | 0.00 |
| 26 | 46 | 0.00 |

(Numerical Embodiment 3)

Unit mm

Surface data

| Surface number | r | d | nd | vd | Effective diameter |
|---|---|---|---|---|---|
| 1 | −190.765 | 2.30 | 1.80100 | 35.0 | 90.16 |
| 2 | 120.401 | 0.63 | | | 87.33 |
| 3 | 115.604 | 14.02 | 1.49700 | 81.5 | 87.67 |
| 4 | −322.471 | 0.40 | | | 87.50 |
| 5 | 341.460 | 2.40 | 1.72047 | 34.7 | 85.99 |
| 6 | 99.922 | 0.17 | | | 84.35 |
| 7 | 101.700 | 16.49 | 1.48749 | 70.2 | 84.35 |
| 8 | −182.054 | 0.15 | | | 84.25 |
| 9 | −5,669.081 | 4.03 | 1.48749 | 70.2 | 82.77 |
| 10 | −377.889 | 6.27 | | | 82.40 |
| 11 | 110.116 | 10.63 | 1.61800 | 63.3 | 78.96 |
| 12 | −592.260 | 0.15 | | | 77.99 |
| 13 | 66.680 | 8.78 | 1.77250 | 49.6 | 68.66 |
| 14 | 157.388 | (Variable) | | | 66.02 |
| 15 | 54.236 | 0.90 | 1.88300 | 40.8 | 23.82 |
| 16 | 12.615 | 6.69 | | | 18.86 |
| 17 | −47.024 | 7.10 | 1.80809 | 22.8 | 17.79 |
| 18 | −11.319 | 0.70 | 1.88300 | 40.8 | 17.11 |
| 19 | 50.932 | 0.20 | | | 16.76 |
| 20 | 24.288 | 2.55 | 1.66680 | 33.0 | 16.94 |
| 21 | 57.544 | (Variable) | | | 16.62 |
| 22 | 50.873 | 1.50 | 1.77250 | 49.6 | 23.05 |
| 23 | 24.618 | 2.52 | 1.84666 | 23.8 | 22.93 |
| 24 | 40.912 | 4.92 | | | 22.83 |
| 25 | −27.231 | 1.50 | 1.77250 | 49.6 | 23.09 |
| 26 | −82.639 | (Variable) | | | 24.97 |
| 27 (Stop) | ∞ | 1.30 | | | 28.65 |
| 28 | 4,128.556 | 4.73 | 1.63854 | 55.4 | 29.79 |
| 29 | −35.481 | 0.15 | | | 30.41 |
| 30 | 87.442 | 4.54 | 1.51633 | 64.1 | 31.49 |
| 31 | −77.456 | 0.15 | | | 31.51 |
| 32 | 41.911 | 8.34 | 1.51742 | 52.4 | 30.59 |
| 33 | −36.286 | 0.90 | 1.83481 | 42.7 | 29.70 |
| 34 | 84.010 | 32.40 | | | 28.89 |
| 35 | 60.438 | 5.80 | 1.49700 | 81.5 | 29.35 |
| 36 | −42.950 | 3.88 | | | 29.13 |
| 37 | −133.834 | 1.40 | 1.83403 | 37.2 | 25.54 |
| 38 | 26.687 | 4.86 | 1.48749 | 70.2 | 24.88 |
| 39 | 143.848 | 2.47 | | | 25.07 |
| 40 | 46.798 | 7.96 | 1.50127 | 56.5 | 25.87 |
| 41 | −22.638 | 1.40 | 1.83481 | 42.7 | 25.76 |
| 42 | −75.076 | 0.15 | | | 26.62 |
| 43 | 48.800 | 4.58 | 1.50127 | 56.5 | 26.85 |
| 44 | −88.164 | 4.00 | | | 26.61 |
| 45 | ∞ | 33.00 | 1.60859 | 46.4 | 40.00 |
| 46 | ∞ | 13.20 | 1.51633 | 64.1 | 40.00 |
| 47 | ∞ | 7.42 | | | 40.00 |
| Image plane | ∞ | | | | |

Various data
Zoom ratio 22.00

| | Wide angle | Intermediate | Telephoto |
|---|---|---|---|
| Focal length | 8.00 | 37.52 | 176.00 |
| F-number | 1.90 | 1.90 | 2.78 |
| Half angle of field (degree) | 34.51 | 8.34 | 1.79 |
| Image height | 5.50 | 5.50 | 5.50 |
| Total lens length | 279.08 | 279.08 | 279.08 |
| BF | 40.64 | 40.64 | 40.64 |
| d14 | 2.00 | 38.85 | 52.28 |
| d21 | 53.08 | 8.51 | 2.23 |
| d26 | 3.35 | 11.07 | 3.92 |
| Position of Entrance pupil | 55.61 | 218.15 | 732.75 |
| Position of Exit pupil | 404.82 | 404.82 | 404.82 |
| Position of Front principal point | 63.77 | 259.22 | 986.69 |
| Position of Rear principal point | −0.58 | −30.10 | −168.58 |

Zoom lens unit data

| Unit | First surface | Focal length | Lens structure length | Front principal point position | Rear principal point position |
|---|---|---|---|---|---|
| 1 | 1 | 67.68 | 66.43 | 38.76 | 1.08 |
| 2 | 15 | −11.03 | 18.14 | 2.98 | −8.96 |
| 3 | 22 | −50.00 | 10.44 | 8.67 | 0.24 |
| 4 | 27 | 65.24 | 135.20 | 73.82 | −156.73 |

Single lens data

| Lens | First surface | Focal length |
|---|---|---|
| 1 | 1 | −91.23 |
| 2 | 3 | 172.56 |
| 3 | 5 | −195.55 |
| 4 | 7 | 135.99 |
| 5 | 9 | 827.51 |
| 6 | 11 | 150.55 |
| 7 | 13 | 143.00 |
| 8 | 15 | −18.70 |
| 9 | 17 | 16.76 |
| 10 | 18 | −10.37 |
| 11 | 20 | 60.71 |
| 12 | 22 | −63.03 |
| 13 | 23 | 67.48 |
| 14 | 25 | −52.95 |
| 15 | 28 | 54.88 |
| 16 | 30 | 80.00 |
| 17 | 32 | 38.83 |
| 18 | 33 | −30.08 |
| 19 | 35 | 51.33 |
| 20 | 37 | −26.40 |
| 21 | 38 | 66.09 |
| 22 | 40 | 31.52 |
| 23 | 41 | −39.09 |
| 24 | 43 | 63.11 |
| 25 | 45 | 0.00 |
| 26 | 46 | 0.00 |

(Numerical Embodiment 4)

Unit mm

Surface data

| Surface number | r | d | nd | vd | Effective diameter |
|---|---|---|---|---|---|
| 1 | −169.698 | 2.30 | 1.80100 | 35.0 | 86.16 |
| 2 | 117.476 | 0.71 | | | 83.65 |
| 3 | 113.054 | 13.94 | 1.49700 | 81.5 | 84.02 |
| 4 | −258.702 | 0.40 | | | 83.89 |
| 5 | 469.324 | 2.40 | 1.72047 | 34.7 | 82.50 |
| 6 | 97.001 | 0.13 | | | 81.11 |
| 7 | 98.427 | 15.58 | 1.48749 | 70.2 | 81.10 |
| 8 | −185.808 | 0.15 | | | 81.09 |
| 9 | 47,783.894 | 4.34 | 1.48749 | 70.2 | 80.01 |
| 10 | −327.469 | 5.52 | | | 79.72 |
| 11 | 113.034 | 10.94 | 1.61800 | 63.3 | 76.81 |
| 12 | −322.267 | 0.15 | | | 75.96 |
| 13 | 60.320 | 8.02 | 1.77250 | 49.6 | 68.16 |
| 14 | 131.912 | (Variable) | | | 66.70 |
| 15 | 46.489 | 0.90 | 1.88300 | 40.8 | 26.35 |
| 16 | 13.065 | 6.93 | | | 20.67 |
| 17 | −67.793 | 7.76 | 1.80809 | 22.8 | 19.93 |

-continued

Unit mm

| | | | | | |
|---|---|---|---|---|---|
| 18 | -12.511 | 0.70 | 1.88300 | 40.8 | 19.10 |
| 19 | 48.553 | 0.20 | | | 18.52 |
| 20 | 23.182 | 2.65 | 1.66680 | 33.0 | 18.74 |
| 21 | 47.701 | (Variable) | | | 18.34 |
| 22 | -29.642 | 1.50 | 1.48749 | 70.2 | 20.84 |
| 23 | -93.561 | 1.90 | 1.92286 | 18.9 | 21.99 |
| 24 | -51.202 | 0.75 | | | 22.48 |
| 25 | -55.023 | 1.50 | 1.88300 | 40.8 | 22.73 |
| 26 | -171.004 | (Variable) | | | 23.55 |
| 27 (Stop) | ∞ | 1.30 | | | 29.25 |
| 28 | 101.557 | 4.98 | 1.63854 | 55.4 | 30.66 |
| 29 | -52.615 | 0.15 | | | 30.97 |
| 30 | 46.798 | 2.62 | 1.51633 | 64.1 | 30.74 |
| 31 | 55.993 | 0.15 | | | 30.19 |
| 32 | 58.158 | 7.72 | 1.51742 | 52.4 | 30.18 |
| 33 | -33.997 | 0.90 | 1.83481 | 42.7 | 29.58 |
| 34 | 477.189 | 32.40 | | | 29.41 |
| 35 | 59.228 | 5.68 | 1.49700 | 81.5 | 28.91 |
| 36 | -42.335 | 6.05 | | | 28.67 |
| 37 | -56.000 | 1.40 | 1.83403 | 37.2 | 24.10 |
| 38 | 29.276 | 4.79 | 1.48749 | 70.2 | 24.01 |
| 39 | 5,425.236 | 0.05 | | | 24.45 |
| 40 | 61.289 | 7.70 | 1.50127 | 56.5 | 24.83 |
| 41 | -19.621 | 1.40 | 1.83481 | 42.7 | 24.94 |
| 42 | -55.246 | 0.15 | | | 26.34 |
| 43 | 41.263 | 5.28 | 1.50127 | 56.5 | 27.11 |
| 44 | -66.299 | 4.00 | | | 26.94 |
| 45 | ∞ | 33.00 | 1.60859 | 46.4 | 40.00 |
| 46 | ∞ | 13.20 | 1.51633 | 64.1 | 40.00 |
| 47 | ∞ | 7.43 | | | 40.00 |
| Image plane | ∞ | | | | |

Various data
Zoom ratio 22.00

| | Wide angle | Intermediate | Telephoto |
|---|---|---|---|
| Focal length | 8.00 | 37.52 | 176.00 |
| F-number | 1.90 | 1.89 | 2.80 |
| Half angle of field (degree) | 34.51 | 8.34 | 1.79 |
| Image height | 5.50 | 5.50 | 5.50 |
| Total lens length | 279.43 | 279.43 | 279.43 |
| BF | 40.65 | 40.65 | 40.65 |
| d14 | 0.83 | 35.98 | 48.35 |
| d21 | 56.28 | 9.39 | 17.48 |
| d26 | 9.59 | 21.33 | 0.86 |
| Position of Entrance pupil | 53.56 | 208.39 | 734.86 |
| Position of Exit pupil | 416.57 | 416.57 | 416.57 |
| Position of Front principal point | 61.71 | 249.35 | 986.57 |
| Position of Rear principal point | -0.57 | -30.10 | -168.57 |

Zoom lens unit data

| Unit | First surface | Focal length | Lens structure length | Front principal point position | Rear principal point position |
|---|---|---|---|---|---|
| 1 | 1 | 63.44 | 64.59 | 38.02 | 2.34 |
| 2 | 15 | -12.52 | 19.13 | 3.24 | -9.21 |
| 3 | 22 | -72.96 | 5.64 | -0.44 | -3.98 |
| 4 | 27 | 62.85 | 132.92 | 71.17 | -121.01 |

Single lens data

| Lens | First surface | Focal length |
|---|---|---|
| 1 | 1 | -85.78 |
| 2 | 3 | 159.83 |
| 3 | 5 | -169.02 |
| 4 | 7 | 133.95 |
| 5 | 9 | 664.93 |

-continued

Unit mm

| | | |
|---|---|---|
| 6 | 11 | 136.21 |
| 7 | 13 | 136.51 |
| 8 | 15 | -20.72 |
| 9 | 17 | 17.68 |
| 10 | 18 | -11.14 |
| 11 | 20 | 64.37 |
| 12 | 22 | -89.39 |
| 13 | 23 | 118.48 |
| 14 | 25 | -91.90 |
| 15 | 28 | 54.74 |
| 16 | 30 | 501.10 |
| 17 | 32 | 42.50 |
| 18 | 33 | -37.78 |
| 19 | 35 | 50.47 |
| 20 | 37 | -22.73 |
| 21 | 38 | 60.16 |
| 22 | 40 | 30.50 |
| 23 | 41 | -36.91 |
| 24 | 43 | 51.37 |
| 25 | 45 | 0.00 |
| 26 | 46 | 0.00 |

(Numerical Embodiment 5)

Unit mm

Surface data

| Surface number | r | d | nd | vd | Effective diameter |
|---|---|---|---|---|---|
| 1 | -185.439 | 2.30 | 1.80100 | 35.0 | 81.02 |
| 2 | 486.543 | 2.84 | | | 78.04 |
| 3 | -98,329.224 | 2.30 | 1.80100 | 35.0 | 77.38 |
| 4 | 91.150 | 16.10 | 1.49700 | 81.5 | 74.93 |
| 5 | -129.965 | 0.40 | | | 74.96 |
| 6 | 165.185 | 7.38 | 1.43387 | 95.1 | 72.82 |
| 7 | -347.780 | 6.90 | | | 72.46 |
| 8 | 109.329 | 10.97 | 1.61800 | 63.3 | 73.62 |
| 9 | -264.615 | 0.15 | | | 73.17 |
| 10 | 63.587 | 5.74 | 1.77250 | 49.6 | 66.53 |
| 11 | 114.104 | (Variable) | | | 65.57 |
| 12 | 65.758 | 0.90 | 1.88300 | 40.8 | 27.08 |
| 13 | 14.444 | 6.74 | | | 21.60 |
| 14 | -76.887 | 7.75 | 1.80809 | 22.8 | 20.89 |
| 15 | -13.515 | 0.70 | 1.88300 | 40.8 | 20.14 |
| 16 | 56.355 | 0.20 | | | 19.60 |
| 17 | 25.182 | 2.72 | 1.66680 | 33.0 | 19.80 |
| 18 | 53.836 | (Variable) | | | 19.40 |
| 19 | 290.152 | 0.75 | 1.77250 | 49.6 | 19.86 |
| 20 | 24.237 | 2.69 | 1.84666 | 23.8 | 20.15 |
| 21 | 51.848 | 4.44 | | | 20.24 |
| 22 | -21.958 | 0.75 | 1.77250 | 49.6 | 20.65 |
| 23 | -41.575 | (Variable) | | | 21.99 |
| 24 | -97.365 | 3.75 | 1.63854 | 55.4 | 27.05 |
| 25 | -28.574 | 0.15 | | | 27.74 |
| 26 | 108.068 | 3.39 | 1.51633 | 64.1 | 29.34 |
| 27 | -100.494 | (Variable) | | | 29.50 |
| 28 (Stop) | ∞ | 1.30 | | | 29.56 |
| 29 | 39.067 | 7.36 | 1.51742 | 52.4 | 29.71 |
| 30 | -38.220 | 0.90 | 1.83481 | 42.7 | 29.33 |
| 31 | 214.266 | 32.40 | | | 29.08 |
| 32 | 78.982 | 4.90 | 1.49700 | 81.5 | 29.28 |
| 33 | -51.551 | 3.48 | | | 29.11 |
| 34 | 156.842 | 1.40 | 1.83403 | 37.2 | 26.01 |
| 35 | 19.962 | 5.80 | 1.48749 | 70.2 | 24.28 |
| 36 | 127.749 | 0.20 | | | 24.21 |
| 37 | 54.186 | 5.90 | 1.50127 | 56.5 | 24.43 |
| 38 | -32.007 | 1.40 | 1.83481 | 42.7 | 24.41 |
| 39 | -361.712 | 7.50 | | | 24.92 |
| 40 | 44.409 | 5.35 | 1.50127 | 56.5 | 26.88 |

-continued

Unit mm

| | | | | | |
|---|---|---|---|---|---|
| 41 | −58.231 | 4.00 | | | 26.74 |
| 42 | ∞ | 33.00 | 1.60859 | 46.4 | 40.00 |
| 43 | ∞ | 13.20 | 1.51633 | 64.1 | 40.00 |
| 44 | ∞ | 7.63 | | | 40.00 |
| Image plane | ∞ | | | | |

Various data
Zoom ratio 22.00

| | Wide angle | Intermediate | Telephoto |
|---|---|---|---|
| Focal length | 8.00 | 37.52 | 176.00 |
| F-number | 1.90 | 1.90 | 2.80 |
| Half angle of field (degree) | 34.51 | 8.34 | 1.79 |
| Image height | 5.50 | 5.50 | 5.50 |
| Total lens length | 270.77 | 270.77 | 270.77 |
| BF | 40.85 | 40.85 | 40.85 |
| d11 | 0.89 | 36.86 | 51.88 |
| d18 | 54.99 | 6.83 | 7.98 |
| d23 | 5.30 | 10.60 | 1.15 |
| d27 | 0.81 | 7.71 | 1.00 |
| Position of Entrance pupil | 50.44 | 191.37 | 746.84 |
| Position of Exit pupil | 411.76 | 411.76 | 411.76 |
| Position of Front principal point | 58.59 | 232.37 | 999.50 |
| Position of Rear principal point | −0.37 | −29.88 | −168.37 |

Zoom lens unit data

| Unit | First surface | Focal length | Lens structure length | Front principal point position | Rear principal point position |
|---|---|---|---|---|---|
| 1 | 1 | 67.22 | 55.08 | 34.71 | 2.65 |
| 2 | 12 | −13.66 | 19.01 | 2.86 | −9.65 |
| 3 | 19 | −36.60 | 8.63 | 4.65 | −2.06 |
| 4 | 24 | 38.42 | 7.29 | 3.31 | −1.32 |
| 5 | 28 | 56.76 | 128.10 | 64.65 | −53.73 |

Single lens data

| Lens | First surface | Focal length |
|---|---|---|
| 1 | 1 | −166.24 |
| 2 | 3 | −112.92 |
| 3 | 4 | 110.15 |
| 4 | 6 | 258.61 |
| 5 | 8 | 126.13 |
| 6 | 10 | 176.28 |
| 7 | 12 | −21.01 |
| 8 | 14 | 19.04 |
| 9 | 15 | −12.22 |
| 10 | 17 | 67.86 |
| 11 | 19 | −34.11 |
| 12 | 20 | 50.94 |
| 13 | 22 | −60.97 |
| 14 | 24 | 61.75 |
| 15 | 26 | 101.04 |
| 16 | 29 | 38.42 |
| 17 | 30 | −38.57 |
| 18 | 32 | 63.37 |
| 19 | 34 | −27.38 |
| 20 | 35 | 47.53 |
| 21 | 37 | 40.91 |
| 22 | 38 | −41.91 |
| 23 | 40 | 50.94 |
| 24 | 42 | 0.00 |
| 25 | 43 | 0.00 |

(Numerical Embodiment 6)

Unit mm

Surface data

| Surface number | r | d | nd | vd | Effective diameter |
|---|---|---|---|---|---|
| 1 | −190.120 | 2.30 | 1.80100 | 35.0 | 83.47 |
| 2 | 462.695 | 3.94 | | | 81.30 |
| 3 | −959.747 | 2.30 | 1.80100 | 35.0 | 80.95 |
| 4 | 91.054 | 17.39 | 1.49700 | 81.5 | 79.83 |
| 5 | −127.266 | 0.40 | | | 80.03 |
| 6 | 184.326 | 8.04 | 1.43387 | 95.1 | 78.98 |
| 7 | −323.399 | 6.90 | | | 78.77 |
| 8 | 116.975 | 11.00 | 1.61800 | 63.3 | 75.88 |
| 9 | −225.193 | 0.15 | | | 75.26 |
| 10 | 63.153 | 5.48 | 1.77250 | 49.6 | 64.59 |
| 11 | 114.604 | (Variable) | | | 63.66 |
| 12 | 50.100 | 0.90 | 1.88300 | 40.8 | 29.75 |
| 13 | 14.895 | 6.98 | | | 23.62 |
| 14 | −102.336 | 8.24 | 1.80809 | 22.8 | 23.32 |
| 15 | −14.817 | 0.70 | 1.88300 | 40.8 | 22.53 |
| 16 | 59.724 | 0.20 | | | 21.81 |
| 17 | 25.261 | 2.94 | 1.66680 | 33.0 | 22.04 |
| 18 | 49.419 | (Variable) | | | 21.55 |
| 19 | −391.926 | 0.75 | 1.77250 | 49.6 | 18.53 |
| 20 | 33.745 | 2.92 | 1.69895 | 30.1 | 18.83 |
| 21 | −777.664 | 2.75 | | | 19.09 |
| 22 | −26.308 | 0.75 | 1.77250 | 49.6 | 19.35 |
| 23 | −76.578 | (Variable) | | | 20.30 |
| 24 | −91.160 | 3.34 | 1.63854 | 55.4 | 26.94 |
| 25 | −34.513 | 0.15 | | | 27.70 |
| 26 | 185.188 | 1.60 | 1.51633 | 64.1 | 28.83 |
| 27 | 238.935 | (Variable) | | | 29.06 |
| 28 (Stop) | ∞ | 1.30 | | | 29.21 |
| 29 | 57.697 | 7.49 | 1.51742 | 52.4 | 30.18 |
| 30 | −28.726 | 0.90 | 1.83481 | 42.7 | 30.19 |
| 31 | −69.744 | 32.40 | | | 30.91 |
| 32 | 78.157 | 5.46 | 1.49700 | 81.5 | 31.24 |
| 33 | −51.198 | 14.07 | | | 31.05 |
| 34 | −50.184 | 1.40 | 1.83403 | 37.2 | 22.69 |
| 35 | 27.375 | 5.52 | 1.48749 | 70.2 | 23.06 |
| 36 | −132.597 | 0.14 | | | 23.84 |
| 37 | 55.260 | 7.35 | 1.50127 | 56.5 | 24.65 |
| 38 | −21.926 | 1.40 | 1.83481 | 42.7 | 24.85 |
| 39 | −59.639 | 0.15 | | | 26.07 |
| 40 | 55.783 | 5.38 | 1.50127 | 56.5 | 26.75 |
| 41 | −44.931 | 4.00 | | | 26.71 |
| 42 | ∞ | 33.00 | 1.60859 | 46.4 | 40.00 |
| 43 | ∞ | 13.20 | 1.51633 | 64.1 | 40.00 |
| 44 | ∞ | 7.48 | | | 40.00 |
| Image plane | ∞ | | | | |

Various data
Zoom ratio 20.00

| | Wide angle | Intermediate | Telephoto |
|---|---|---|---|
| Focal length | 8.00 | 35.77 | 160.00 |
| F-number | 1.90 | 1.89 | 2.74 |
| Half angle of field (degree) | 34.51 | 8.74 | 1.97 |
| Image height | 5.50 | 5.50 | 5.50 |
| Total lens length | 283.39 | 283.39 | 283.39 |
| BF | 40.7 | 40.7 | 40.7 |
| d11 | 0.80 | 38.42 | 53.06 |
| d18 | 57.77 | 8.55 | 9.41 |
| d23 | 10.10 | 13.92 | 1.45 |
| d27 | 0.96 | 8.74 | 5.70 |
| Position of Entrance pupil | 51.99 | 193.91 | 680.08 |
| Position of Exit pupil | 352.44 | 352.44 | 352.44 |
| Position of Front principal point | 60.17 | 233.39 | 914.30 |
| Position of Rear principal point | −0.52 | −28.28 | −152.52 |

-continued

Unit mm

Zoom lens unit data

| Unit | First surface | Focal length | Lens structure length | Front principal point position | Rear principal point position |
|---|---|---|---|---|---|
| 1 | 1 | 67.54 | 57.89 | 38.12 | 5.82 |
| 2 | 12 | −15.98 | 19.96 | 3.12 | −9.97 |
| 3 | 19 | −43.97 | 7.17 | 3.90 | −1.35 |
| 4 | 24 | 80.11 | 5.09 | 2.97 | −0.23 |
| 5 | 28 | 60.27 | 133.15 | 69.87 | −85.98 |

Single lens data

| Lens | First surface | Focal length |
|---|---|---|
| 1 | 1 | −166.84 |
| 2 | 3 | −103.03 |
| 3 | 4 | 109.38 |
| 4 | 6 | 271.23 |
| 5 | 8 | 125.65 |
| 6 | 10 | 173.17 |
| 7 | 12 | −24.16 |
| 8 | 14 | 20.36 |
| 9 | 15 | −13.31 |
| 10 | 17 | 73.36 |
| 11 | 19 | −40.00 |
| 12 | 20 | 45.98 |
| 13 | 22 | −51.97 |
| 14 | 24 | 84.66 |
| 15 | 26 | 1,572.59 |
| 16 | 29 | 38.02 |
| 17 | 30 | −58.77 |
| 18 | 32 | 62.94 |
| 19 | 34 | −20.93 |
| 20 | 35 | 46.92 |
| 21 | 37 | 32.21 |
| 22 | 38 | −42.02 |
| 23 | 40 | 50.34 |
| 24 | 42 | 0.00 |
| 25 | 43 | 0.00 |

(Numerical Embodiment 7)

Unit mm

Surface data

| Surface number | r | d | nd | vd | Effective diameter |
|---|---|---|---|---|---|
| 1 | −197.729 | 2.30 | 1.80100 | 35.0 | 81.11 |
| 2 | 663.175 | 2.83 | | | 79.48 |
| 3 | −1,826.105 | 2.30 | 1.80100 | 35.0 | 79.18 |
| 4 | 87.973 | 17.38 | 1.49700 | 81.5 | 78.01 |
| 5 | −119.734 | 0.40 | | | 78.20 |
| 6 | 163.379 | 6.78 | 1.43387 | 95.1 | 77.02 |
| 7 | −910.947 | 6.90 | | | 76.79 |
| 8 | 106.509 | 11.02 | 1.61800 | 63.3 | 74.84 |
| 9 | −256.578 | 0.15 | | | 74.24 |
| 10 | 61.706 | 5.74 | 1.77250 | 49.6 | 66.54 |
| 11 | 108.634 | (Variable) | | | 65.62 |
| 12 | 53.443 | 0.90 | 1.88300 | 40.8 | 23.37 |
| 13 | 13.103 | 6.17 | | | 18.82 |
| 14 | −45.556 | 6.91 | 1.80809 | 22.8 | 17.89 |
| 15 | −11.549 | 0.70 | 1.88300 | 40.8 | 17.18 |
| 16 | 51.876 | 0.20 | | | 16.75 |
| 17 | 25.570 | 2.40 | 1.66680 | 33.0 | 16.88 |
| 18 | 52.027 | (Variable) | | | 16.56 |
| 19 | 40.017 | 0.75 | 1.72916 | 54.7 | 22.47 |
| 20 | 27.581 | 2.55 | 1.84666 | 23.8 | 22.36 |
| 21 | 53.410 | 3.66 | | | 22.19 |
| 22 | −37.732 | 0.75 | 1.83481 | 42.7 | 22.30 |
| 23 | 212.023 | (Variable) | | | 23.26 |
| 24 | 199.203 | 3.89 | 1.63854 | 55.4 | 24.61 |
| 25 | −38.073 | 0.15 | | | 25.16 |
| 26 | 119.933 | 2.13 | 1.51633 | 64.1 | 25.81 |
| 27 | −4,303.262 | (Variable) | | | 25.91 |
| 28 (Stop) | ∞ | 1.30 | | | 26.72 |
| 29 | 54.677 | 6.34 | 1.51742 | 52.4 | 27.01 |
| 30 | −30.330 | 0.90 | 1.83481 | 42.7 | 26.85 |
| 31 | −143.575 | 32.40 | | | 27.13 |
| 32 | 58.649 | 5.20 | 1.49700 | 81.5 | 26.84 |
| 33 | −42.038 | 4.55 | | | 26.60 |
| 34 | −47.301 | 1.40 | 1.83403 | 37.2 | 23.40 |
| 35 | 33.174 | 5.05 | 1.48749 | 70.2 | 23.66 |
| 36 | −159.823 | 1.57 | | | 24.27 |
| 37 | 76.391 | 6.78 | 1.50127 | 56.5 | 25.19 |
| 38 | −24.065 | 1.40 | 1.83481 | 42.7 | 25.37 |
| 39 | −51.045 | 0.15 | | | 26.31 |
| 40 | 40.225 | 4.64 | 1.50127 | 56.5 | 26.66 |
| 41 | −134.593 | 4.00 | | | 26.35 |
| 42 | ∞ | 33.00 | 1.60859 | 46.4 | 40.00 |
| 43 | ∞ | 13.20 | 1.51633 | 64.1 | 40.00 |
| 44 | ∞ | 7.45 | | | 40.00 |
| Image plane | ∞ | | | | |

Various data
Zoom ratio 22.00

| | Wide angle | Intermediate | Telephoto |
|---|---|---|---|
| Focal length | 8.00 | 37.52 | 176.00 |
| F-number | 1.90 | 1.92 | 2.80 |
| Half angle of field (degree) | 34.51 | 8.34 | 1.79 |
| Image height | 5.50 | 5.50 | 5.50 |
| Total lens length | 260.05 | 260.05 | 260.05 |
| BF | 40.67 | 40.67 | 40.67 |
| d11 | 1.70 | 39.47 | 53.10 |
| d18 | 49.22 | 5.57 | 5.31 |
| d23 | 1.67 | 11.08 | 1.39 |
| d27 | 8.15 | 4.61 | 0.93 |
| Position of Entrance pupil | 49.45 | 209.41 | 754.59 |
| Position of Exit pupil | 403.13 | 403.13 | 403.13 |
| Position of Front principal point | 57.61 | 250.49 | 1,008.87 |
| Position of Rear principal point | −0.55 | −30.08 | −168.55 |

Zoom lens unit data

| Unit | First surface | Focal length | Lens structure length | Front principal point position | Rear principal point position |
|---|---|---|---|---|---|
| 1 | 1 | 67.00 | 55.80 | 35.16 | 2.71 |
| 2 | 12 | −11.00 | 17.28 | 3.14 | −8.12 |
| 3 | 19 | −58.26 | 7.71 | 10.18 | 3.53 |
| 4 | 24 | 41.11 | 6.17 | 2.11 | −1.83 |
| 5 | 28 | 51.49 | 121.89 | 57.99 | −56.32 |

Single lens data

| Lens | First surface | Focal length |
|---|---|---|
| 1 | 1 | −188.65 |
| 2 | 3 | −104.02 |
| 3 | 4 | 104.65 |
| 4 | 6 | 319.11 |
| 5 | 8 | 122.76 |
| 6 | 10 | 174.69 |
| 7 | 12 | −19.75 |
| 8 | 14 | 17.36 |
| 9 | 15 | −10.58 |
| 10 | 17 | 72.24 |
| 11 | 19 | −124.36 |
| 12 | 20 | 63.79 |

-continued

Unit mm

| | | |
|---|---|---|
| 13 | 22 | -38.11 |
| 14 | 24 | 50.16 |
| 15 | 26 | 225.18 |
| 16 | 29 | 38.52 |
| 17 | 30 | -45.97 |
| 18 | 32 | 49.98 |
| 19 | 34 | -23.05 |
| 20 | 35 | 56.65 |
| 21 | 37 | 37.20 |
| 22 | 38 | -55.55 |
| 23 | 40 | 62.07 |
| 24 | 42 | 0.00 |
| 25 | 43 | 0.00 |

(Numerical Embodiment 8)

Unit mm

Surface data

| Surface number | r | d | nd | vd | Effective diameter |
|---|---|---|---|---|---|
| 1 | -185.426 | 2.30 | 1.80100 | 35.0 | 81.19 |
| 2 | 512.885 | 2.68 | | | 79.49 |
| 3 | 49,127.644 | 2.30 | 1.80100 | 35.0 | 79.25 |
| 4 | 88.694 | 16.66 | 1.49700 | 81.5 | 78.13 |
| 5 | -131.518 | 0.40 | | | 78.30 |
| 6 | 164.535 | 8.00 | 1.43387 | 95.1 | 77.46 |
| 7 | -362.458 | 6.90 | | | 77.28 |
| 8 | 108.962 | 10.83 | 1.61800 | 63.3 | 75.47 |
| 9 | -269.474 | 0.15 | | | 74.97 |
| 10 | 62.891 | 5.87 | 1.77250 | 49.6 | 66.86 |
| 11 | 114.933 | (Variable) | | | 65.96 |
| 12 | 51.343 | 0.90 | 1.88300 | 40.8 | 23.16 |
| 13 | 12.504 | 6.25 | | | 18.49 |
| 14 | -46.154 | 6.87 | 1.80809 | 22.8 | 17.62 |
| 15 | -11.458 | 0.70 | 1.88300 | 40.8 | 16.99 |
| 16 | 51.919 | 0.20 | | | 16.66 |
| 17 | 24.272 | 2.48 | 1.66680 | 33.0 | 16.84 |
| 18 | 52.682 | (Variable) | | | 16.52 |
| 19 | 71.345 | 0.75 | 1.48749 | 70.2 | 22.59 |
| 20 | 48.722 | 2.05 | 1.92286 | 18.9 | 22.71 |
| 21 | 100.315 | 2.97 | | | 22.67 |
| 22 | -42.404 | 0.75 | 1.88300 | 40.8 | 22.78 |
| 23 | 1,609.743 | (Variable) | | | 23.58 |
| 24 | 586.478 | 3.22 | 1.63854 | 55.4 | 24.46 |
| 25 | -46.404 | 0.15 | | | 24.99 |
| 26 | 90.613 | 2.70 | 1.51633 | 64.1 | 25.74 |
| 27 | -232.947 | (Variable) | | | 25.85 |
| 28 (Stop) | ∞ | 1.30 | | | 26.38 |
| 29 | 252.703 | 4.99 | 1.51742 | 52.4 | 26.48 |
| 30 | -27.061 | 0.90 | 1.83481 | 42.7 | 26.49 |
| 31 | -65.330 | 32.40 | | | 27.06 |
| 32 | 63.845 | 5.00 | 1.49700 | 81.5 | 27.13 |
| 33 | -44.642 | 6.16 | | | 26.92 |
| 34 | -55.657 | 1.40 | 1.83403 | 37.2 | 23.34 |
| 35 | 28.068 | 5.03 | 1.48749 | 70.2 | 23.53 |
| 36 | -6,410.544 | 0.19 | | | 24.19 |
| 37 | 67.206 | 7.15 | 1.50127 | 56.5 | 24.74 |
| 38 | -22.087 | 1.40 | 1.83481 | 42.7 | 25.02 |
| 39 | -47.654 | 0.15 | | | 26.23 |
| 40 | 43.622 | 5.18 | 1.50127 | 56.5 | 26.92 |
| 41 | -67.211 | 4.00 | | | 26.73 |
| 42 | ∞ | 33.00 | 1.60859 | 46.4 | 40.00 |
| 43 | ∞ | 13.20 | 1.51633 | 64.1 | 40.00 |
| 44 | ∞ | 7.41 | | | 40.00 |
| Image plane | ∞ | | | | |

-continued

Unit mm

Various data
Zoom ratio 22.00

| | Wide angle | Intermediate | Telephoto |
|---|---|---|---|
| Focal length | 8.00 | 37.52 | 176.00 |
| F-number | 1.90 | 1.92 | 2.80 |
| Half angle of field (degree) | 34.51 | 8.34 | 1.79 |
| Image height | 5.50 | 5.50 | 5.50 |
| Total lens length | 259.84 | 259.84 | 259.84 |
| BF | 40.63 | 40.63 | 40.63 |
| d11 | 1.98 | 39.72 | 52.81 |
| d18 | 49.98 | 5.23 | 3.49 |
| d23 | 1.22 | 13.35 | 1.19 |
| d27 | 8.69 | 3.57 | 4.39 |
| Position of Entrance pupil | 49.55 | 213.09 | 754.62 |
| Position of Exit pupil | 404.72 | 404.72 | 404.72 |
| Position of Front principal point | 57.71 | 254.15 | 1,008.58 |
| Position of Rear principal point | -0.59 | -30.11 | -168.59 |

Zoom lens unit data

| Unit | First surface | Focal length | Lens structure length | Front principal point position | Rear principal point position |
|---|---|---|---|---|---|
| 1 | 1 | 66.42 | 56.09 | 35.19 | 2.75 |
| 2 | 12 | -10.96 | 17.41 | 2.96 | -8.45 |
| 3 | 19 | -72.53 | 6.53 | 7.85 | 2.57 |
| 4 | 24 | 44.03 | 6.07 | 2.10 | -1.81 |
| 5 | 28 | 49.94 | 121.44 | 56.10 | -49.97 |

Single lens data

| Lens | First surface | Focal length |
|---|---|---|
| 1 | 1 | -168.63 |
| 2 | 3 | -110.19 |
| 3 | 4 | 109.01 |
| 4 | 6 | 261.37 |
| 5 | 8 | 126.46 |
| 6 | 10 | 170.54 |
| 7 | 12 | -18.82 |
| 8 | 14 | 17.14 |
| 9 | 15 | -10.51 |
| 10 | 17 | 64.75 |
| 11 | 19 | -317.59 |
| 12 | 20 | 99.49 |
| 13 | 22 | -46.51 |
| 14 | 24 | 67.19 |
| 15 | 26 | 126.24 |
| 16 | 29 | 47.32 |
| 17 | 30 | -55.63 |
| 18 | 32 | 53.53 |
| 19 | 34 | -22.06 |
| 20 | 35 | 57.15 |
| 21 | 37 | 33.93 |
| 22 | 38 | -50.30 |
| 23 | 40 | 53.39 |
| 24 | 42 | 0.00 |
| 25 | 43 | 0.00 |

TABLE 1

| Conditional Expression | Numerical Embodiment | | | | | | | |
|---|---|---|---|---|---|---|---|---|
| | 1 | 2 | 3 | 4 | 5 | 6 | 7 | 8 |
| (1) \|fn1/fp\| | 0.67 | 0.86 | 0.93 | 0.75 | 0.67 | 0.87 | 1.95 | 3.19 |
| (2) β3w | 0.29 | 0.34 | 0.37 | 0.47 | 0.30 | 0.32 | 0.42 | 0.48 |
| (3) f3/f2 | 2.70 | 2.72 | 4.53 | 5.83 | 2.68 | 2.75 | 5.30 | 6.62 |
| (4) \|f1/f2\| | 5.39 | 4.16 | 6.14 | 5.07 | 4.92 | 4.23 | 6.09 | 6.06 |
| (5) \|f3/fw\| | 4.39 | 5.60 | 6.25 | 9.12 | 4.57 | 5.50 | 7.28 | 9.07 |
| (6) fn1/fn2 | 0.47 | 0.80 | 1.19 | 0.97 | 0.56 | 0.77 | 3.26 | 6.83 |
| (7) Nn1/Np | 1.02 | 1.04 | 0.96 | 0.78 | 0.96 | 1.04 | 0.93 | 0.78 |
| (8) vn1/vp | 1.71 | 1.65 | 2.09 | 3.72 | 2.09 | 1.65 | 2.30 | 3.72 |

FIG. 19 is a schematic diagram of a main part of an image pickup apparatus 125 (television camera system) using the zoom lens according to each of Embodiments as an image pickup optical system. In FIG. 19, a zoom lens 101 according to any one of Embodiments 1 to 8 and a camera body 124 are provided, and the zoom lens 101 is detachably mounted on the camera body 124. The image pickup apparatus (image pickup system) 125 has a structure in which the zoom lens 101 is mounted on the camera body 124. Note that, in this case, the zoom lens 101 and the camera body 124 may be integrally provided.

The zoom lens 101 includes a lens unit F, a zoom unit LZ, and a relay lens unit R for imaging. The lens unit F includes a focusing lens unit. The zoom unit LZ includes a lens unit configured to move on the optical axis for zooming and a lens unit configured to move on the optical axis so as to correct image plane variation accompanying the zooming. The zoom lens 101 includes an aperture stop SP.

Drive mechanisms 114 and 115 such as helicoids or cams drive the lens unit F and the zoom unit LZ, respectively, in the optical axis direction. Motors (drive units) 116 to 118 electrically drive the drive mechanisms 114 and 115 and the aperture stop SP. Detectors 119 to 121 such as encoders, potentiometers, or photosensors, detect positions of the lens unit F and the zoom unit LZ on the optical axis and a stop diameter of the aperture stop SP.

The camera body 124 includes: a glass block 109 corresponding to an optical filter or a color separation prism in the camera body 124; and a solid-state image pickup element (photoelectric conversion element) such as a CCD sensor or a CMOS sensor, for receiving a subject image formed by the zoom lens 101. Further, CPUs 111 and 122 perform various drive controls of the camera body 124 and the main body of the zoom lens 101, respectively.

When the zoom lens according to the present invention is applied to the television camera as described above, the image pickup apparatus having high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-173916, filed Aug. 28, 2014, which is hereby incorporated by reference herein in its entirety.

What is claimed is:

1. A zoom lens, comprising, in order from an object side to an image side:
a first lens unit having a positive refractive power that does not move for zooming;
a second lens unit having a negative refractive power that moves during the zooming;
a third lens unit having a negative refractive power that moves during the zooming;
a fourth lens unit having a positive refractive power that moves during the zooming;
an aperture stop; and
a fifth lens unit having a positive refractive power that does not move for zooming,
the third lens unit comprising:
a cemented lens formed by cementing a single negative lens and a single positive lens; and
a single negative lens,
wherein the following conditional expressions are satisfied:

$$0.60 < |fn1x/fpx| < 3.5; \text{ and}$$

$$0.24 < \beta3wx < 0.53,$$

where fn1x represents a focal length of the single negative lens included in the cemented lens, fpx represents a focal length of the single positive lens included in the cemented lens, and β3wx represents a lateral magnification of the third lens unit at a wide angle end.

2. A zoom lens according to claim 1, wherein the following conditional expression is satisfied:

$$2.5 < f3x/f2x < 7.5,$$

where f2x represents a focal length of the second lens unit, and f3x represents a focal length of the third lens unit.

3. A zoom lens according to claim 1, wherein the following conditional expression is satisfied:

$$3.7 < |f1x/f2x| < 7.0,$$

where f1x represents a focal length of the first lens unit, and f2x represents a focal length of the second lens unit.

4. A zoom lens according to claim 1, wherein the cemented lens of the third lens unit has a cementing surface convex to the object side.

5. A zoom lens according to claim 1, wherein the following conditional expression is satisfied:

$$3.5 < |f3x/fwx| < 11.0,$$

where f3x represents a focal length of the third lens unit, and fwx represents a focal length of an entire system of the zoom lens at the wide angle end.

6. A zoom lens according to claim 1, wherein the following conditional expression is satisfied:

$$0.4 < fn1x/fn2x < 8.0,$$

where fn2x represents a focal length of one of the negative lenses of the third lens unit, which is not included in the cemented lens.

7. A zoom lens according to claim 1, wherein the following conditional expressions are satisfied:

$$0.65 < Nn1x/Npx < 1.20; \text{ and}$$

$$1.4 < vn1x/vpx < 4.2,$$

where Nn1x and vn1x respectively represent a refractive index and an Abbe number of a material of the single negative lens included in the cemented lens, and Npx and vpx respectively represent a refractive index and an Abbe number of a material of the single positive lens included in the cemented lens.

8. An image pickup apparatus comprising:
a zoom lens comprising, in order from an object side to an image side:
  a first lens unit having a positive refractive power that does not move for zooming;
  a second lens unit having a negative refractive power that moves during the zooming;
  a third lens unit having a negative refractive power that moves during the zooming;
  a fourth lens unit having a positive refractive power that moves during the zooming;
  an aperture stop; and
  a fifth lens unit having a positive refractive power that does not move for zooming,
the third lens unit comprising:
  a cemented lens formed by cementing a single negative lens and a single positive lens; and
  a single negative lens,
  wherein the following conditional expressions are satisfied:

$0.60 < |fn1x/fpx| < 3.5$; and $0.24 < \beta 3wx < 0.53$, where fn1x represents a focal length of the single negative lens included in the cemented lens, fpx represents a focal length of the single positive lens included in the cemented lens, and $\beta 3wx$ represents a lateral magnification of the third lens unit at a wide angle end; and
an image pickup element receiving an optical image formed by the zoom lens.

* * * * *